US009072032B2

(12) United States Patent
Soliman et al.

(10) Patent No.: US 9,072,032 B2
(45) Date of Patent: Jun. 30, 2015

(54) FEMTOCELL INDICATION OF MOBILE DEVICE PROXIMITY AND TRANSMISSION OF MOBILE IDENTITY TO ASSIST IN RESOLVING FEMTOCELL DISAMBIGUATION

(75) Inventors: Samir S. Soliman, San Diego, CA (US); Soumya Das, San Diego, CA (US); Olufunmilola O. Awoniyi, San Diego, CA (US); Andrei D. Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/223,048

(22) Filed: Aug. 31, 2011

(65) Prior Publication Data

US 2012/0094665 A1    Apr. 19, 2012

Related U.S. Application Data

(60) Provisional application No. 61/393,533, filed on Oct. 15, 2010.

(51) Int. Cl.
H04B 17/00 (2006.01)
H04B 1/38 (2006.01)
(Continued)

(52) U.S. Cl.
CPC .......... *H04W 48/16* (2013.01); *H04W 36/0055* (2013.01); *H04W 36/04* (2013.01); *H04W 84/045* (2013.01)

(58) Field of Classification Search
CPC .. H04W 24/00; H04B 17/0042; H04L 1/0026
USPC .......... 455/4.11, 67.11, 422.1, 434, 436, 450, 455/73, 418, 411, 423, 435.1, 444, 446, 455/458, 39, 440; 370/331, 241, 252, 255, 370/328, 338, 225
See application file for complete search history.

(56) References Cited

U.S. PATENT DOCUMENTS 6,574,266 B1   6/2003 Haartsen
6,768,726 B2   7/2004 Dorenbosch et al.
(Continued)

FOREIGN PATENT DOCUMENTS

CN   101150864 A   3/2008
CN   101359969 A   2/2009
(Continued)

OTHER PUBLICATIONS

Tiedemann E.G.: "Femtocell Activities in 3GPP2 TSG-C" 3GPP2 Mar. 31, 2009, XP002599307 Retrieved from the Internet: URL:ftp:// ftp.3gpp2.org/TSGX/Working/2009/2009-03- New%20Orleans/ All%20TSG%20Femto%20Discussion/ XS1 -20090331 -004__ TSG-C__Femto%20Overview-090330.ppt [retrieved on Sep. 2, 2010].

(Continued)

*Primary Examiner* — William D Cumming
(74) *Attorney, Agent, or Firm* — Jeffrey D. Jacobs

(57) ABSTRACT

Methods, systems, and devices are described that may provide for femtocells to indicate the proximity of mobile user equipments and/or provide mobile identity to assist in resolving femtocell disambiguation. A femtocell may detect a user equipment in its proximity using an out-of-band link. The femtocell may transmit a proximity indication message to a macro network controller via a core network. The macro network may direct the user equipment to perform a variety of tasks, including directing the user equipment to do a handover to the femtocell. Some embodiments may utilize existing user equipment registrations and femto-to-macrocell outbound handover procedures to address problems such as femtocell ambiguity resolution and triggering frequency searches at a macro network when a current macrocell signal strength is good. These embodiments may utilize dummy identifiers to register the user equipment to facilitate addressing these problems.

24 Claims, 16 Drawing Sheets

(51) Int. Cl.

| | | |
|---|---|---|
| *H04M 1/66* | (2006.01) | |
| *H04M 3/16* | (2006.01) | |
| *H04W 4/00* | (2009.01) | |
| *H04W 48/16* | (2009.01) | |
| *H04W 36/00* | (2009.01) | |
| *H04W 36/04* | (2009.01) | |
| *H04W 84/04* | (2009.01) | |

(56) References Cited

U.S. PATENT DOCUMENTS

| | | | |
|---|---|---|---|
| 7,925,259 B2 | 4/2011 | Nylander et al. | |
| 8,086,236 B2* | 12/2011 | Wu | 455/436 |
| 8,102,825 B2* | 1/2012 | Kalhan | 370/338 |
| 8,180,368 B2 | 5/2012 | Anderson et al. | |
| 8,185,116 B2* | 5/2012 | Wu | 455/436 |
| 8,204,481 B2* | 6/2012 | Kone | 455/411 |
| 8,270,431 B2 | 9/2012 | Brisebois et al. | |
| 8,630,640 B2 | 1/2014 | Das et al. | |
| 2005/0111409 A1 | 5/2005 | Spear et al. | |
| 2005/0186948 A1 | 8/2005 | Gallagher et al. | |
| 2006/0148485 A1 | 7/2006 | Kangas et al. | |
| 2006/0258323 A1 | 11/2006 | Hara et al. | |
| 2007/0037578 A1 | 2/2007 | Besterman | |
| 2008/0076386 A1 | 3/2008 | Khetawat et al. | |
| 2008/0076411 A1 | 3/2008 | Khetawat et al. | |
| 2008/0305801 A1 | 12/2008 | Burgess et al. | |
| 2009/0040972 A1 | 2/2009 | Robson et al. | |
| 2009/0044239 A1 | 2/2009 | Cha | |
| 2009/0082020 A1 | 3/2009 | Ch'ng et al. | |
| 2009/0092097 A1* | 4/2009 | Nylander et al. | 370/331 |
| 2009/0098873 A1 | 4/2009 | Gogic | |
| 2009/0124235 A1 | 5/2009 | Bosch et al. | |
| 2009/0129341 A1 | 5/2009 | Balasubramanian et al. | |
| 2009/0156213 A1 | 6/2009 | Spinelli et al. | |
| 2009/0163216 A1 | 6/2009 | Hoang et al. | |
| 2009/0186615 A1 | 7/2009 | Kwon et al. | |
| 2009/0196253 A1 | 8/2009 | Semper | |
| 2009/0207805 A1 | 8/2009 | Zou | |
| 2009/0219888 A1 | 9/2009 | Chen et al. | |
| 2009/0247170 A1 | 10/2009 | Balasubramanian et al. | |
| 2009/0286510 A1 | 11/2009 | Huber et al. | |
| 2009/0310568 A1 | 12/2009 | Chen et al. | |
| 2009/0325583 A1 | 12/2009 | Burgess et al. | |
| 2010/0029278 A1 | 2/2010 | Fang et al. | |
| 2010/0056132 A1 | 3/2010 | Gallagher | |
| 2010/0056160 A1 | 3/2010 | Kim et al. | |
| 2010/0120398 A1 | 5/2010 | Chang et al. | |
| 2010/0124927 A1 | 5/2010 | Eskicioglu et al. | |
| 2010/0144371 A1 | 6/2010 | Savoor | |
| 2010/0240365 A1* | 9/2010 | Chen | 455/434 |
| 2010/0273432 A1* | 10/2010 | Meshkati et al. | 455/67.11 |
| 2010/0273471 A1* | 10/2010 | Meshkati et al. | 455/422.1 |
| 2010/0273473 A1* | 10/2010 | Meshkati et al. | 455/423 |
| 2010/0273481 A1* | 10/2010 | Meshkati et al. | 455/435.1 |
| 2010/0304741 A1 | 12/2010 | Gogic et al. | |
| 2010/0315974 A1 | 12/2010 | Richardson et al. | |
| 2010/0330903 A1* | 12/2010 | Chabrerie | 455/39 |
| 2011/0085564 A1 | 4/2011 | Taylor et al. | |
| 2011/0143738 A1* | 6/2011 | Kone | 455/418 |
| 2011/0165875 A1* | 7/2011 | Wu | 455/436 |
| 2011/0170481 A1* | 7/2011 | Gomes et al. | 370/328 |
| 2011/0171915 A1* | 7/2011 | Gomes et al. | 455/73 |
| 2011/0189998 A1* | 8/2011 | Joo et al. | 455/444 |
| 2011/0195715 A1* | 8/2011 | Wu | 455/436 |
| 2011/0237269 A1* | 9/2011 | Chen | 455/450 |
| 2011/0263242 A1 | 10/2011 | Tinnakornsrisuphap et al. | |
| 2011/0263258 A1 | 10/2011 | Soliman et al. | |
| 2012/0014267 A1* | 1/2012 | Gomes et al. | 370/252 |
| 2012/0064903 A1* | 3/2012 | Pani et al. | 455/450 |
| 2012/0083245 A1* | 4/2012 | Adjakple et al. | 455/411 |
| 2012/0083280 A1* | 4/2012 | Liu et al. | 455/446 |
| 2012/0094663 A1 | 4/2012 | Awoniyi et al. | |
| 2012/0094665 A1* | 4/2012 | Soliman et al. | 455/435.1 |
| 2012/0094666 A1* | 4/2012 | Awoniyi et al. | 455/435.1 |
| 2012/0106349 A1* | 5/2012 | Adjakple et al. | 370/241 |
| 2012/0108234 A1 | 5/2012 | Bao et al. | |
| 2012/0115474 A1* | 5/2012 | Lee et al. | 455/435.1 |
| 2012/0149362 A1* | 6/2012 | Tooher et al. | 455/423 |
| 2012/0252435 A1 | 10/2012 | Bienas et al. | |
| 2012/0263145 A1* | 10/2012 | Marinier et al. | 370/331 |
| 2012/0269095 A1* | 10/2012 | Dalsgaard et al. | 370/255 |
| 2012/0322466 A1* | 12/2012 | Das et al. | 455/458 |
| 2013/0003698 A1* | 1/2013 | Olvera-Hernandez et al. | 370/331 |
| 2013/0017820 A1* | 1/2013 | Drazynski et al. | 455/422.1 |

FOREIGN PATENT DOCUMENTS

| | | | |
|---|---|---|---|
| GB | 2444756 | A | 6/2008 |
| JP | 2001320755 | A | 11/2001 |
| JP | 2006319878 | A | 11/2006 |
| JP | 2009302977 | A | 12/2009 |
| JP | 2010147682 | A | 7/2010 |
| KR | 20100026921 | A | 3/2010 |
| WO | 2008055251 | A2 | 5/2008 |
| WO | 2008073554 | | 6/2008 |
| WO | 2008088592 | | 7/2008 |
| WO | WO2009120902 | A1 | 10/2009 |
| WO | 2009139675 | A1 | 11/2009 |
| WO | WO2010009162 | A1 | 1/2010 |
| WO | WO2011020481 | A1 | 2/2011 |
| WO | WO2011028954 | A1 | 3/2011 |
| WO | 2011093531 | A1 | 8/2011 |

OTHER PUBLICATIONS

Anonymous: "Interoperability Specification (IOS) for Femtocell Access Points", 3GGP2 3GGP2 A.S0024-0 vl.O, Mar. 1, 2010, p. 64PP, XP002659293, Retrieved from the Internet: URL:http://www.3gpp2.org/publi cjitml/specs /A.S0024-0_vl.0_100302.pdf [retrieved on Sep. 16, 2011].

Anonymous: "Interoperability Specification (IOS) for Femtocell Access Points", 3GGP2 3GGP2 A.S0024-A vl.O, Apr. 1, 2011, p. 128PP, XP002650581, Retrieved from the Internet: URL:http://www.3gpp2.org/public html/specs /A.S0024-A%20vl.0%20Femto%20IOS-Pub 201104 .pdf [retrieved on Jul. 15, 2011].

Airvana, Qualcomm: "Active Call Hand-in in CDMA2000 1x", A20-20081027-008r0, 3GPP2, Oct. 27, 2008, pp. 7.

Telefonica: "Dynamic H(e)NB Switching by Means of a Low Power Radio Interface for Energy Savings and Interference Reduction", R3-110030, 3GPP, Jan. 21, 2011, pp. 1-5.

* cited by examiner

FEMTOCELL INDICATION OF MOBILE DEVICE PROXIMITY AND TRANSMISSION OF MOBILE IDENTITY TO ASSIST IN RESOLVING FEMTOCELL DISAMBIGUATION

CROSS REFERENCES

The present Application claims priority to Provisional Application No. 61/393,533 entitled "Uniquely Identifying Target Femtocell to Facilitate Femto-Assisted Active Hand-in" filed Oct. 15, 2010, and assigned to the assignee hereof and hereby expressly incorporated by reference herein. This application is also related to: U.S. patent application Ser. No. 13/223,103, filed Aug. 31, 2011, entitled "UNIQUELY IDENTIFYING TARGET FEMTOCELL TO FACILITATE FEMTO-ASSISTED ACTIVE HAND," and U.S. patent application Ser. No. 13/222,972, filed Aug. 31, 2011, entitled "PROXIMITY DETECTION FOR FEMTOCELLS USING OUT-OF-BAND LINKS," and, each assigned to the assignee hereof and hereby expressly incorporated by reference herein.

BACKGROUND

Communication networks are in wide use today, and often have multiple devices in communication over wireless links to carry voice and data. Many of these devices, such as cellular phones, smartphones, laptops, and tablets, are mobile, and may connect with a network wirelessly via a base station, access point, wireless router, or Node B (collectively referred to herein as "access points"). A mobile device may remain within the service area of such an access point for a relatively long period of time (thereby being "camped on" the access point) or may travel relatively rapidly through access point service areas, with cellular handover or reselection techniques being used for maintaining a communication session, or for idle mode operation as association with access points is changed.

Issues with respect to available spectrum, bandwidth, or capacity may result in access being unavailable or inadequate between certain mobile devices and an access point. Likewise, issues with respect to wireless signal propagation (e.g., shadowing, multipath fading, interference, etc.) may result in access being unavailable for particular mobile devices.

Cellular networks have employed the use of various cell types, such as macrocells, microcells, picocells, and femtocells, to provide desired bandwidth, capacity, and wireless communication coverage within service areas. Femtocells may be used to provide wireless communication in areas of poor network coverage (e.g., inside of buildings), to provide increased network capacity, and to utilize broadband network capacity for backhaul. There are a number of challenges to accomplish a macrocell to femtocell hand-in.

SUMMARY

The following description generally relates to methods, systems, and/or devices that may provide for femtocells to indicate the proximity of mobile devices and/or provide mobile identity to assist in resolving femtocell disambiguation. Embodiments may support macrocell-to-femtocell hand-ins of active macro communications for mobile devices. A femtocell may detect a mobile device in its proximity (e.g., using an out-of-band link established by an out-of-band radio integrated with the femtocell). Having detected the mobile device, the femtocell may transmit a proximity indication message to a macro network controller via a core network. Upon receiving the proximity indication message, the macro network may direct the mobile device to perform a variety of tasks, including directing the mobile device to do a handover to the femtocell.

Some embodiments may utilize existing container messages to communicate the proximity indication message transparently from the femtocell to the macro network without the traversing network devices examining or altering the content of the message. In some embodiments, the proximity indication message may be communicated by utilizing mobile device registrations and femto-to-macrocell outbound handover procedures to address problems such as femtocell ambiguity resolution and triggering frequency searches at a macro network when a current macrocell signal strength is good. These embodiments may utilize dummy identifiers to register the mobile device to facilitate addressing these problems.

A method of utilizing a proximity indication message from a femtocell regarding a user equipment may include receiving the proximity indication message originating from the femtocell. The proximity indication message may indicate that the user equipment is in proximity to the femtocell. A request may be transmitted to the user equipment based on receiving the proximity indication message from the femtocell.

The proximity indication message may include an identifier of the user equipment, an identifier of the femtocell, and a frequency of the femtocell. The method of utilizing the proximity indication message may further include determining a macro identifier of the user equipment utilizing the identifier of the user equipment. The identifier of the user equipment may include an OOB identifier of the user equipment.

The request transmitted to the user equipment may direct the user equipment to do a handover to the femtocell. The request transmitted to the user equipment may direct the user equipment to perform one or more measurements of the femtocell. The method of utilizing the proximity indication message may further include directing the user equipment to do a handover to the femtocell based on the one or more measurements.

The request transmitted to the user equipment may direct the user equipment to read system information of the femtocell. The request transmitted to the user equipment may direct the user equipment to perform an inter-frequency scan for one or more femtocells. The request transmitted to the user equipment may direct the user equipment to perform an intra-frequency scan for one or more femtocells. The request transmitted to the user equipment may occur when a signal strength between the user equipment and a macrocell is good.

A system for utilizing a proximity indication message from a femtocell regarding a user equipment may include a means for receiving the proximity indication message originating from the femtocell. The proximity indication message may indicate that the user equipment is in proximity to the femtocell. The system may include a means for transmitting a request to the user equipment based on receiving the proximity indication message from the femtocell. The system may further include a means for determining a macro identifier of the user equipment utilizing the identifier of the user equipment, wherein the identifier of the user equipment includes an OOB identifier of the user equipment.

A network device may include a core network interface configured to receive the proximity indication message originating from the femtocell. The proximity indication message may indicate that the user equipment is in proximity to the femtocell. The network device may include a macro network interface configured to transmit a request to the user equipment based on receiving the proximity indication message from the femtocell. The request transmitted to the user equipment may direct the user equipment to do a handover to the femtocell. The request transmitted to the user equipment may direct the user equipment to perform one or more measurements of the femtocell. The request transmitted to the user equipment may direct the user equipment to perform at least an intra-frequency scan or an inter-frequency scan for one or more femtocells.

A computer program product for utilizing a proximity indication message from a femtocell regarding a user equipment may include a computer-readable medium that may include: code for receiving the proximity indication message originating from the femtocell, where the proximity indication message indicates that the user equipment is in proximity to the femtocell; and code for transmitting a request to the user equipment based on receiving the proximity indication message from the femtocell.

A method for a femtocell to indicate proximity of a user equipment may include detecting, at the femtocell, the user equipment in proximity to the femtocell using an out-of-band (OOB) communications link. Information from the user equipment may be received. A proximity indication message may be transmitted from the femtocell that includes at least a portion of the information from the user equipment to a macro network via a core network. The proximity indication message may identify the user equipment and the femtocell. The proximity indication message may include an identifier of the user equipment, an identifier of the femtocell, and a frequency of the femtocell. The user equipment identifier may include an international mobile subscriber identity (IMSI) of the user equipment. The user equipment identifier may include an OOB identifier of the user equipment. The femtocell identifier may include a primary scrambling code (PSC) of the femtocell.

A system for a femtocell to indicate proximity of a user equipment may include: a means for detecting, at the femtocell, the user equipment in proximity to the femtocell using an out-of-band (OOB) communications link; a means for receiving information from the user equipment; and a means for transmitting, from the femtocell, a proximity indication message that includes at least a portion of the information from the user equipment to a macro network via a core network.

A femtocell may include an out-of-band (OOB) frequency module configured to: detect, at the femtocell, the user equipment in proximity to the femtocell using an out-of-band (OOB) communications link; and receive information from the user equipment. The femtocell may include an in-band module frequency module configured to transmit, from the femtocell, a proximity indication message that includes at least a portion of the information from the user equipment to a macro network via a core network. The proximity indication message may include an identifier of the user equipment, an identifier of the femtocell, and a frequency of the femtocell. The user equipment identifier may include an international mobile subscriber identity (IMSI) of the user equipment. The user equipment identifier may include an OOB identifier of the user equipment. The femtocell identifier may include a primary scrambling code (PSC) of the femtocell.

A computer program product for a femtocell to indicate proximity of a user equipment may include a computer-readable medium that may include: code for detecting, at the femtocell, the user equipment in proximity to the femtocell using an out-of-band (OOB) communications link; code for receiving information from the user equipment; and code for transmitting, from the femtocell, a proximity indication message that includes at least a portion of the information from the user equipment to a macro network via a core network.

A method of providing mobile identity to assist in resolving femtocell disambiguation may include receiving a registration request for a user equipment from a femtocell. The registration may provide a proximity indication between the femtocell and the user equipment. A dummy identifier may be transmitted to register the user equipment at a core network. The dummy identifier may include a unique identifier of the user equipment associated with a macro identifier of the user equipment. The dummy identifier may include an OOB identifier of the user equipment.

The method of providing mobile identity to assist in resolving femtocell disambiguation may further include receiving a relocation request from the femtocell and forwarding the relocation request to the core network. The relocation request may include an identifier of the femtocell and an identifier of a macro network. The registration request may include an OOB identifier of the user equipment and a macro identifier of the user equipment. The method of providing mobile identity to assist in resolving femtocell disambiguation may further include verifying that the user equipment is allowed on the femtocell and transmitting an acceptance message to the femtocell regarding registering the user equipment.

A system for providing mobile identity to assist in resolving femtocell disambiguation may include: a means for receiving a registration request for a user equipment from a femtocell, where the registration provides a proximity indication between the femtocell and the user equipment; and a means for transmitting a dummy identifier to register the user equipment at a core network.

A femtocell gateway may include a femtocell interface configured to receive a registration request for a user equipment from a femtocell, where the registration may provide a proximity indication between the femtocell and the user equipment. The femtocell gateway may include a core network interface configured to transmitting a dummy identifier to register the user equipment at a core network.

The femtocell interface may be further configured receiving a relocation request from the femtocell. The core network interface may be further configured to forward the relocation request to the core network. The femtocell gateway may further include a processor, communicatively coupled with a memory, the femtocell interface, and the core network interface, and configured to: verify that the user equipment is allowed on the femtocell; and transmit an acceptance message to the femtocell regarding registering the user equipment.

A computer program product for providing mobile identity to assist in resolving femtocell disambiguation may include a computer-readable medium that may include: code for receiving a registration request for a user equipment from a femtocell, where the registration provides a proximity indication between the femtocell and the user equipment; and code for transmitting a dummy identifier to register the user equipment at a core network.

A method of providing mobile identity to assist in resolving femtocell disambiguation may include registering a user equipment at a core network with a dummy identifier. A relocation message for the user equipment may be received at the core network. The dummy identifier and the relocation message may be transmitted from the core network to a macro network. The method of providing mobile identity to assist in resolving femtocell disambiguation may further include determining the dummy identifier for transmission to the macro network utilizing the user equipment registration at the core network.

A system for providing mobile identity to assist in resolving femtocell disambiguation may include: a means for registering a user equipment at a core network with a dummy identifier; a means for receiving a relocation message for the user equipment at the core network; and a means for transmitting the dummy identifier and the relocation message from the core network to a macro network.

A method of providing mobile identity to assist in resolving femtocell disambiguation may include receiving a relocation message and a dummy identifier of a user equipment at a macro network. The method may include determining whether the dummy identifier can be matched with a specific user equipment. The method may further include directing one or more user equipments to perform at least an inter-frequency or an intra-frequency scan for one or more femtocells in response to receiving the dummy identifier.

Determining whether the dummy identifier can be matched with the specific user equipment may include determining the specific user equipment matched with the dummy identifier. Directing the one or more user equipments associated with the dummy identifier to perform at least the inter-frequency or the intra-frequency scan for one or more femtocells may include directing the specific user equipment to perform at least the inter-frequency or the intra-frequency scan for one or more femtocells.

Determining whether the dummy identifier can be matched with the specific user equipment may include determining no user equipment can be matched with the dummy identifier. Directing the one or more user equipments to perform at least the inter-frequency or the intra-frequency scan for the one or more femtocells may include determining a list of one or more candidate user equipments to direct to perform the at least the inter-frequency or the intra-frequency scan for the one or more femtocells. One or more frequencies may be determined for at least the inter-frequency or the intra-frequency scan.

A system for providing mobile identity to assist in resolving femtocell disambiguation may include: a means for receiving a relocation message and a dummy identifier of a user equipment at a macro network; and a means for determining whether the dummy identifier can be matched with a specific user equipment. The system may further include a means for directing one or more user equipments to perform at least an inter-frequency or an intra-frequency scan for one or more femtocells in response to receiving the dummy identifier.

A macro network controller may include a core network interface configured to receive a relocation message and a dummy identifier of a user equipment from a core network. The macro network controller may include a processor, communicatively coupled with the core network interface, a memory, and a macro network interface, and configured to determine whether the dummy identifier can be matched with a specific user equipment. The processor may be further configured to direct one or more user equipments to perform at least an inter-frequency or an intra-frequency scan for one or more femtocells in response to receiving the dummy identifier.

A computer program product for providing mobile identity to assist in resolving femtocell disambiguation may include a computer-readable medium that may include: code for receiving a relocation message and a dummy identifier of a user equipment at a macro network; and code for determining whether the dummy identifier can be matched with a specific user equipment. The computer-readable medium may further include code for directing one or more user equipments to perform at least an inter-frequency or an intra-frequency scan for one or more femtocells in response to receiving the dummy identifier.

The foregoing has outlined rather broadly examples according to disclosure in order that the detailed description that follows may be better understood. Additional features will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The following description generally relates to methods, systems, and/or devices that may provide for femtocells to indicate the proximity of mobile devices and/or provide mobile identity to assist in resolving femtocell disambiguation. Embodiments may support macrocell-to-femtocell hand-ins of active macro communications for mobile devices. A femtocell may detect a mobile device in its proximity (e.g., using an out-of-band link established by an out-of-band radio integrated with the femtocell). Having detected the mobile device in its proximity, the femtocell may transmit a proximity indication message to a macro network controller via a core network. Upon receiving the proximity indication message, the macro network may direct the mobile device to perform a variety of tasks, including directing the mobile device to do a handover to the femtocell.

Some embodiments may utilize existing container messages to communicate the proximity indication message transparently from the femtocell to the macro network without the traversing network devices examining or altering the content of the message. In some embodiments, the proximity indication message may be communicated by utilizing mobile device registrations and femto-to-macrocell outbound handover procedures to address problems such as femtocell ambiguity resolution and triggering frequency searches at a macro network when a current macrocell signal strength is good. These embodiments may utilize dummy identifiers to register the mobile devices to facilitate addressing these problems.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
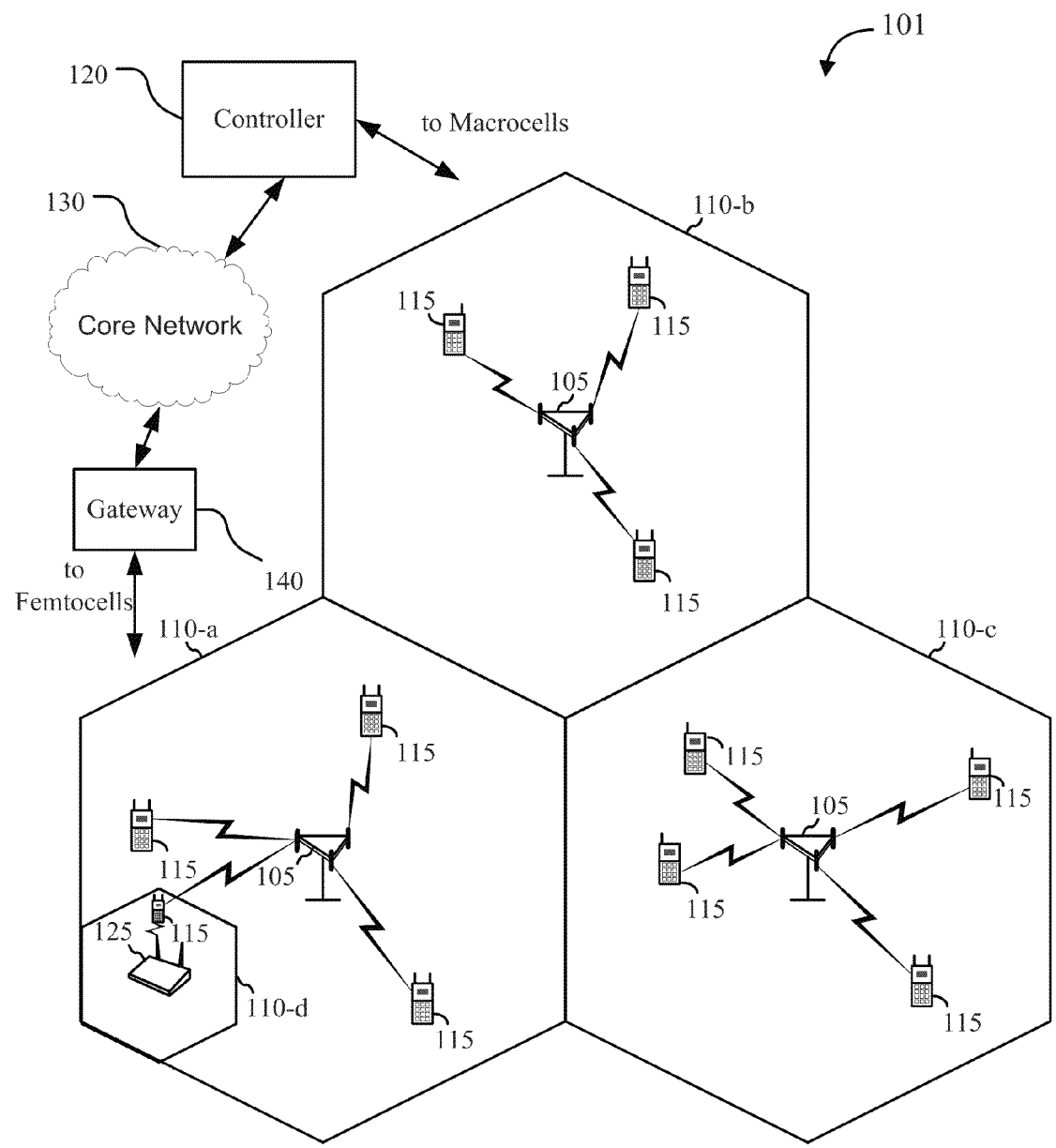
FIG. 1 shows a block diagram of a wireless communications system in accordance with various embodiments.

Referring first to FIG. 1, a block diagram illustrates an example of a communications system 101. The system 101 may include macrocell base stations 105, user equipments (UEs) 115, a base station controller 120, a femtocell 125, and/or a core network 130 (the controller 120 may be integrated into the core network 130). The system 101 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 101 may be a multi-carrier LTE network capable of efficiently allocating network resources.

The UEs 115 may be any type of mobile station, mobile device, access terminal, subscriber unit, or user equipment. The UEs 115 may include cellular phones and wireless communications devices, but may also include personal digital assistants (PDAs), smartphones, other handheld devices, netbooks, notebook computers, etc. Thus, the term user equipment (UE) should be interpreted broadly hereinafter, including the claims, to include any type of wireless or mobile communications device.

The macrocell base stations 105 may wirelessly communicate with the UEs 115 via a base station antenna. The macrocell base stations 105 may be configured to communicate with the UEs 115 under the control of the controller 120 via multiple carriers. The controller 120 may also be in communication with the core network 130. Each of the base station 105 sites can provide communication coverage for a respective geographic area. In some embodiments, macrocell base stations 105 may be referred to as a Node B. The coverage area for each macrocell base station 105 here is identified as 110-a, 110-b, or 110-c. The coverage area for a base station may be divided into sectors (not shown, but making up only a portion of the coverage area). The system 101 may include base stations 105 of different types (e.g., macro, micro, and/or pico base stations). As used herein, the term "cell" may refer to 1) a sector, or 2) a site (e.g., a base station 105). Thus, the term "macrocell" may refer to 1) a macrocell sector, 2) a macrocell base station (e.g., macrocell base station 105), and/or 3) a macrocell controller. Thus, the term "femtocell" may refer to 1) a femtocell sector, or 2) a femtocell base station (e.g., femtocell access point).

For the discussion below, the UEs 115 operate on (are "camped on") a macro or similar network facilitated by multiple macrocell base stations 105. Each macrocell base station 105 may cover a relatively large geographic area (e.g., hundreds of meters to several kilometers in radius) and may allow unrestricted access by terminals with service subscription. A portion of the UEs 115 may also be registered to operate (or otherwise allowed to operate) in femtocell coverage area 110-d (e.g., communicating with femtocell 125, which may be referred to as a femtocell access point (FAP) in some cases), within the coverage area of a macrocell 110-a. As a UE 115 approaches a femtocell 125, there may be need for novel mechanisms so that the UE 115 may migrate to the femtocell 125 from the macrocell base station 105. The femtocells 125 may communicate with a gateway 140 that may aggregate traffic from multiple femtocells 125. The gateway 140 may then route the traffic of the femtocells 125 to the core network 130. The gateway 140 may be referred to as a femtocell gateway 140 in some cases. In some embodiments, the gateway 140 may be a Home Location Register (HLR). The gateway 140 may be considered as part of the core network 130 in some embodiments.

Strategic deployment of femtocells may be used to mitigate mobile device power consumption, as mobile devices typically operate using an internal power supply, such as a small battery, to facilitate highly mobile operation. Femtocells may be used to offload traffic and reduce spectrum usage at a macrocell. Femtocells may also be utilized to provide service within areas which might not otherwise experience adequate or even any service (e.g., due to capacity limitations, bandwidth limitations, signal fading, signal shadowing, etc.), thereby allowing mobile devices to reduce searching times, to reduce transmit power, to reduce transmit times, etc. A femtocell 125 may provide service within a relatively small service area (e.g., within a house or building). Accordingly, a UE 115 is typically disposed near a femtocell 125 when being served, often allowing the UE 115 to communicate with reduced transmission power.

By way of example, the femtocell 125 may be implemented as a Home Node B ("HNB") or Home eNode B (HeNB), and located in a user premises, such as a residence, an office building, etc. Femtocell 125 may be used hereinafter generically to describe any femtocell access point, and should not be interpreted as limiting. The femtocell 125 location may be chosen for maximum coverage (e.g., in a centralized location), to allow access to a global positioning satellite (GPS) signal (e.g., near a window), or in other locations. A set of UEs 115 may be registered on (e.g., on a whitelist of) a single femtocell (e.g., femtocell 125) that provides coverage over substantially an entire user premises. The "home" femtocell 125 may provide the UE 115 with access to communication services via a connection to the macrocell communications network. As used herein, the macrocell communications network is assumed to be a wireless wide-area network (WWAN). As such, terms like "macrocell network" and "WWAN network" are interchangeable. Similar techniques may be applied to other types of network environments, femtocell coverage topologies, etc., without departing from the scope of the disclosure or claims.

Systems, methods, devices, and computer program products are described to provide for the femtocell 125 to indicate proximity of UEs 115 and/or to provide mobile identity to assist in resolving femtocell disambiguation. Embodiments may also identify target femtocells 125 to facilitate hand-ins from the macrocell 105 to the femtocell 125. Embodiments may solve several problems including femtocell confusion or disambiguation, where more than one femtocell 125 in the same geographical area (e.g., under the same Mobile Switching Station) may have the same femtocell identifier, such as a PCI, PSC, and/or PN offset. Embodiments may also provide for triggering frequency scans by the UE to look for the femtocell 125 on a different frequency when the signal strength of the serving macrocell 105 is good.

In example configurations, the femtocell 125 may be integrated with one or more OOB transceivers. The femtocell 125 may transmit or receive OOB discovery signals (e.g., Bluetooth page or inquiry signals) to or from a UE 115 to facilitate the exchange of femtocell and device information. The femtocell 125 may, of course, also be configured to connect with a UE 115 via in-band signals. The femtocell 125 may detect the UE 115 in proximity to the femtocell 125 using an OOB communications link. The femtocell 125 may identify an identifier of the UE 115.

In some embodiments, the femtocell 125 may generate a proximity indication message when it detects the UE 115 in its proximity. The proximity indication message may include the identifier of the UE 115, an identifier of the femtocell 125, and a frequency of the femtocell 125. The proximity indication message may be transmitted from the femtocell 125 to a femtocell gateway 140. The femtocell gateway may forward the proximity indication message to the core network 130 and then to the controller 120. Note that in some cases, the femtocell 125 may be considered as part of the core network 130. Similarly, the controller 120 may be considered as part of a macro network (which may be referred to using reference number 100, but not shown in this figure for clarity reasons, but is shown in some subsequent figures) that may also include one or more macrocells 105 in some cases.

The identifier of the UE 115 may include a macro identifier of the UE 115, such as an international mobile subscriber identity (IMSI). In some cases, an OOB identifier may be utilized if IMSI identifier of the UE 115 is not available for some reason. Devices and/or systems such as the femtocell gateway 140 and/or the core network 130 may include mappings between the macro network identifier of the UE 115 and the OOB identifier of the UE 115, which may be utilized in different ways as discussed in more detail below with respect to FIG. 2.

Once a macro network 100, such as at the controller 120, receives the proximity indication message from femtocell 125, the macro network 100 may know that the UE 115 is in proximity or in the cover area of the femtocell 125. The macro network 100, or the controller 120 in particular, may send one or more requests to the UE 115. The requests may include a variety of tasks for the UE 115 to perform, including, but not limited to, directing the UE 115 to perform a handover to the femtocell 125, directing the UE 115 to perform one or more measurements of the femtocell 125 and, based on the measurements, direct the UE 115 to perform a handover to the femtocell 125, and/or directing the UE 115 to read the System Information (SI).

In other embodiments, the femtocell 125 may generate a proximity indication message when it detects the UE 115 in its proximity and send it to macro network 100 using existing container messages. Transparent container messages may be forwarded by the femtocell gateway 140 and the core network 130 to the macro network 100 without these nodes examining or altering any information in the messages.

In other embodiments, once the femtocell 125 has detected the UE 115 in its proximity using an OOB link, a UE 115 registration process and femtocell-to-macrocell outbound handover procedures may be utilized to address the femtocell ambiguity resolution problem and triggering frequency searches at the macro network 100, such as at the controller 120, for the UE 115.

The femtocell 125 may first register the UE 115 at the femtocell gateway 140, where the registration may include an OOB identifier of the UE 115 and a macro identifier of the UE 115 (e.g. an IMSI). The femtocell gateway 140 may provide access control, verifying that the UE 115 is allowed on the femtocell 125. UE 115 registration may then occur at the core network 130 using a dummy identifier. The dummy identifier may be a unique identifier of the UE 115 in some cases, such as an OOB identifier of the UE 115. In other cases, the dummy identifier may not be unique, and may be utilized for indication but not necessarily attached to a particular UE 115.

Once the UE 115 is registered at the core network 130, the femtocell 125 may inititiate a femtocell-to-macrocell handout procedure by sending a relocation request to the femtocell gateway 140, which in turn forwards the relocation request to the core network 130. When the core network 130 receives the relocation request, it may determine the dummy identifier of the UE 115 using the prior registration information. The core network 130 may then send the dummy identifier of the UE 115 along with the relocation request information to the macro network 100, such as to the controller 120.

After the macro network 100 (e.g. the controller 120) receives the dummy identifier of the UE 115 and the relocation request, the macro network 100/controller 120 may determine if the dummy identifier can be matched to a specific UE 115. If the macro network 100/controller 120 determines a specific UE 115 associated with the dummy identifier, the macro network 100/controller 120 may direct the specific UE 115 to perform different functions such as performing inter and/or intra frequency scans for femtocells 125. Once the UE 115 has detected such femtocells 125, which may include the femtocell 125 that registered the UE 115 with the core network 130, the macro network 100/controller 120 may direct the UE 115 to perform a handover to the femtocell 125. If the macro network 100/controller 120 cannot determine a specific UE 115 associated with the dummy identifier, the macro network 100/controller 120 may determine a candidate list of active UEs 115 (using e.g. reported UE 115 signal strength, UE 115 locations, location of femtocells 125 in the area, etc). The macro network 100/controller 120 may direct the list of candidate UEs 115 to perform different functions such as performing inter and/or intra frequency scans for femtocells 125. Once the a specific UE 115 has detected such femtocells 125, which may include the femtocell 125 that registered the specific UE 115 with the core network 130, the macro network 100/controller 120 may direct the UE 115 to perform a handover to the femtocell 125.

Frequency spectrum may be allocated to a particular macrocell 105 or femtocell 125, or for OOB signaling, in some cases. A macrocell frequency range may be a first frequency channel within a set of frequencies allocated to WWAN communications, and a femtocell frequency range may be a second frequency channel within the set of frequencies allocated to WWAN communications, for example. The macrocell 105 frequency range and the femtocell 125 frequency range may be the same, or different (therefore, there may be an intra-frequency or inter-frequency search for a femtocell 125). Additional macrocell 105 frequency ranges may occupy other frequency channels within the set of frequencies allocated to WWAN communications.

As used herein, "out-of-band," or "OOB," includes any type of communications that are out-of-band with respect to the macrocell or femtocell communications network. For example, a femtocell 125 and/or the UE 115 may be configured to operate using Bluetooth (e.g., class 1, class 1.5, and/or class 2), ZigBee (e.g., according to the IEEE 802.15.4-2003 wireless standard), near field communication (NFC), WiFi, an ultra-wideband (UWB) link, and/or any other useful type of communications out of the macrocell network band.

Figure 2:
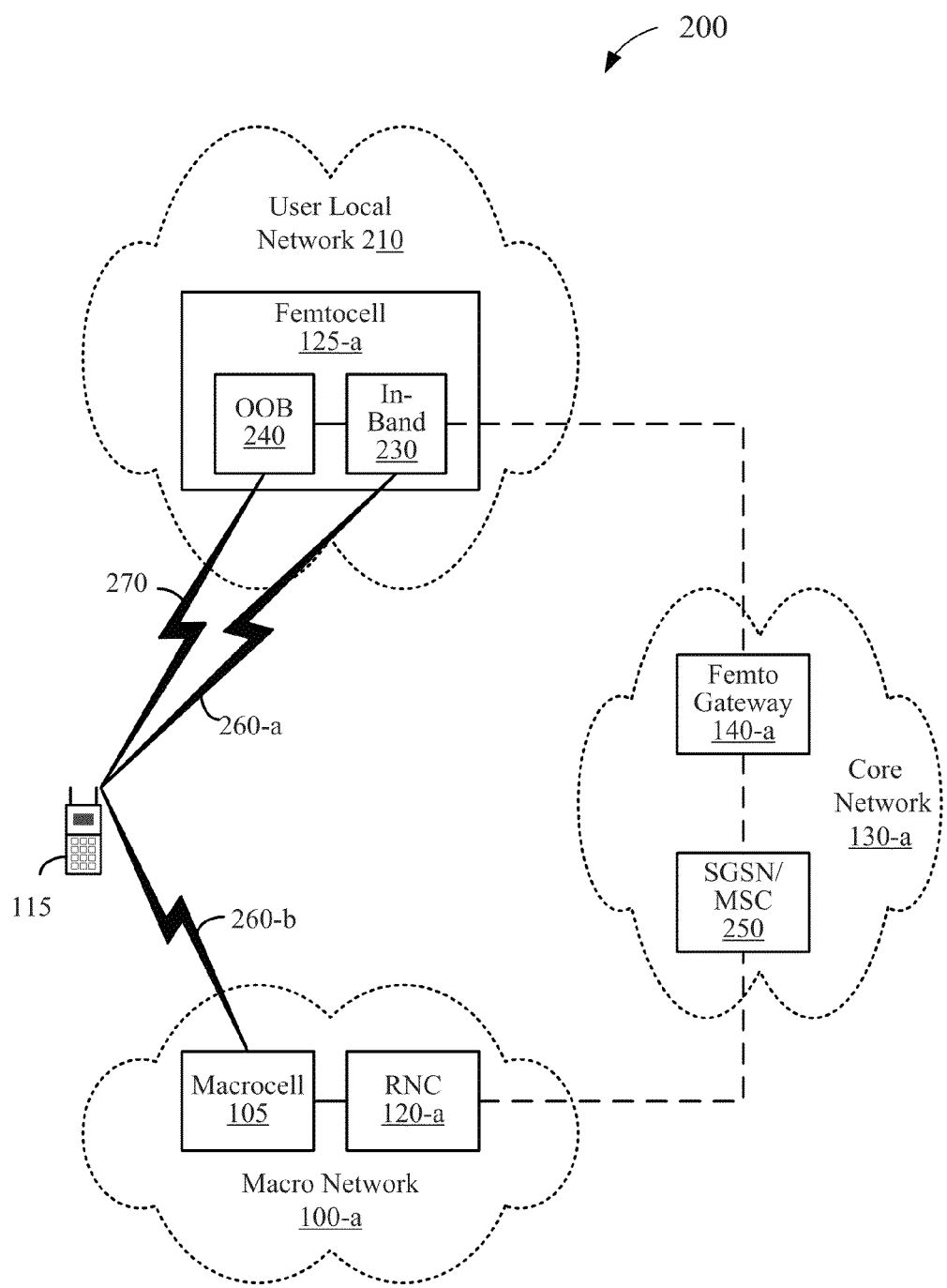
FIG. 2 shows a network diagram of a communications system for facilitating active hand-in using a femtocell in accordance with various embodiments.

Turning to FIG. 2, a network diagram is shown of a communications system 200 for femtocells to indicate proximity of UEs and provide mobile identity to assist in resolving femtocell disambiguation, along with facilitating active hand-in from a macrocell to a femtocell, in accordance with various embodiments. Communications system 200 may be an example of the communications system 101 of FIG. 1.

The communications system 200 may include a macro network 100-a, a user local network 210, a core network 130-a, and one or more UEs 115. The core network 130-a may include, among other things, a femtocell gateway 140-a (which may be a Home Location Register (HLR), in some cases) and/or a SGSN/MSC 250. In some embodiments, the femtocell gateway 140-a may be considered outside the core network 130-a. The femtocell gateway 140-a may be in communication with a number of femtocells 125-a (only one femtocell 125-a is shown for clarity), and the SGSN/MSC 250 is in communication with multiple macrocell base stations 105 via one or more macro RNCs 120-a (only one macrocell base station 105 is show for clarity). The femtocell 125-a may be in communication through in-band frequency module 230 with the macro network 100-a via core network 130-a elements, such that cellular communications may be facilitated through the femtocell 125-a using functionality of the femtocell gateway 140-a and/or SGSN/MSC 250.

A UE 115 in active communications with the macrocell base station 105 (over a macro communications link 260-b) may approach a coverage area of the femtocell 125-a. As described above, the macro network 100-a (e.g., the macro RNC 120-a) may determine that a handover is needed based on a measurement report from the UE 115. The measurement report may identify the target femtocell 125-a by its physical layer cell identifier (e.g., its PSC). A handover request may then be sent by the SGSN/MSC 250 to the target femtocell gateway 140-a for identifying an appropriate femtocell 125 for the hand-in.

As discussed, particularly where multiple femtocells 125 share a cell identifier, it may be difficult or impossible for the femtocell gateway 140-a to reliably determine the appropriate target femtocell 125 for hand-in using the physical layer cell identifier alone. Some embodiments may exploit features of femtocell 125. As shown, the user local network 210 includes the in-band frequency module 230 functionality integrated with OOB functionality of an OOB frequency module 240 as part of a femtocell 125. This OOB functionality may be facilitated over an OOB communications link 270 that can be established between the UE 115 and the OOB frequency module 240. This in-band functionality may be facilitated over an in-band communications link 260-a that can be established between the UE 115 and the in-band frequency module 230. The in-band communications link 260-a may be established, for example, when a hand-in occurs from macrocell 105 to femtocell 125-a.

While many different types of out-of-band communications may be used to facilitate functionality described herein, the discussion below focuses on Bluetooth as facilitating the OOB communications of these embodiments. Other embodiments may utilize other types of out-of-band communications. Bluetooth may provide certain features. One feature is that Bluetooth radios may be integrated into many UEs 115, so that the Bluetooth functionality can be exploited for many users without modifying their existing UEs 115. Another feature is that the tolerable path loss between two "Class 1.5" Bluetooth devices may be comparable or even higher than between a femtocell 125 and a UE 115. In any given environment, this higher tolerable path loss may translate to higher effective range (e.g., facilitating femtocell 125 discovery, handover, and/or interference mitigation, as described herein).

Yet another feature of Bluetooth is that the Bluetooth address (BD_ADDR) can provide a unique, 48-bit address used to identify each Bluetooth enabled device. The Bluetooth address may be used when a device communicates with another device, and is divided into a 24-bit LAP (Lower Address Part), a 16-bit NAP (Non-significant Address Part), and an 8-bit UAP (Upper Address Part). The LAP may be assigned by a manufacturer and may be unique for each Bluetooth device, while UAP and NAP may be part of an Organizationally Unique Identifier (OUI). Using the Bluetooth address, each Bluetooth adapter in any device may be identified according to a globally unique value.

As described more fully below, embodiments may operate in the context of a system, like the communications system 200 of FIG. 2, to provide for the femtocell 125 to indicate proximity of UEs 115 and/or to provide mobile identity to assist in resolving femtocell disambiguation. Embodiments may also identify target femtocells 125 to facilitate hand-ins from the macrocell 105 to the femtocell 125. Some embodiments may involve minimal or no change to legacy macro networks 100-a and/or to legacy UEs 115. Some embodiments, however, may require some modifications, as discussed in more detail below.

Each of the UE 115 and the femtocell 125-*a* (through OOB frequency module 240, for example) may have a unique Bluetooth device address (BD_ADDR) that may be used for paging the other device (e.g., UE 115 pages the femtocell 125-*a* or the femtocell 125-*a* pages the UE 115). It is understood that the BD_ADDR of the other device may be known by the paging device. Notably, the same or similar techniques may be used for other types of out-of-band addressing. For example, the devices may know each other's WiFi MAC address, etc. The UE 115 may then assist the macro network 100-*a* in effecting the active hand-in.

In some embodiments, after an OOB communications link 270 is established with the OOB frequency module 240 of the femtocell 125-*a*, the UE 115 can communicate a macro identifier (e.g., IMSI) and/or the OOB identifier (e.g., Bluetooth device address) of the UE 115 to the femtocell 125-*a*. Different components with the system 200 may then receive these different identifiers of the UE 115 and may maintain mappings between UE 115's identifiers such as the macro identifier and/or the OOB identifier of the UE 115.

In some embodiments, the femtocell 125-*a* may maintain UE 115 mappings. Typically, the UE mappings map a macro identifier of each UE 115 (e.g., the International Mobile Subscriber Identity (IMSI), Mobile Equipment Identifier (MEID), Electronic Serial Number (ESN), etc.) with an OOB identifier corresponding to the UE 115's OOB radio (e.g., Bluetooth device address, WiFi MAC address, etc.). When the femtocell 125-*a* is a restricted access femtocell 125-*a*, the UE mappings may be maintained only for authorized users. For example, an access control list may be maintained at the femtocell 125-*a* that includes or is associated with the UE mappings.

Notably, there may various ways to establish the UE mappings. According to one exemplary technique, the UE 115 calls a particular number, which may automatically trigger an OOB pairing (e.g., a Bluetooth pairing) between the UE 115 and the femtocell 125-*a*. Thus, the mapping between the UE macro identifier and OOB identifier may be established. According to another exemplary technique, a user manually enters the UE 115's macro identifier (e.g., IMSI) and OOB identifier (e.g., BD_ADDR) into a user interface at the femtocell 125-*a*. According to yet another exemplary technique, a user enters the mapping information via a portal (e.g., a web page), and the femtocell 125-*a* downloads the information (e.g., or the femtocell 125-*a* includes a web server and the portal directly addresses femtocell 125-*a*). In yet another exemplary technique, the OOB identifier of the UE can be entered into the portal by using a sniffer, an OOB-enabled device that wirelessly obtains the OOB identifier and reports it to the portal.

Embodiments that may provide for the femtocell 125-*a* to indicate proximity of UEs 115, to provide mobile identity to assist in resolving femtocell disambiguation, and/or to identify target femtocells 125-*a* to facilitate hand-ins from the macrocell 105 to the femtocell 125-*a* may involve use of a femtocell 125-*a* having an in-band frequency module 230 integrated with an OOB frequency module 240. As illustrated in FIG. 2, and as described in a number of exemplary configurations above, the OOB frequency module 240 includes an OOB device (e.g., an OOB radio) that is communicatively coupled with the in-band frequency module 230. For example, the in-band frequency module 230 and the OOB frequency module 240 may be physically integrated into a single housing or assembly (e.g., and in communication over a bus or some other internal connection), or the OOB frequency module 240 may be separately housed and may be in communication with the in-band frequency module 230 using a wired or wireless connection. Typically, the OOB frequency module 240 is located close enough to the in-band frequency module 230 so that proximity detection by the OOB frequency module 240 indicates proximity also to the in-band frequency module 230.

In some other configurations, the OOB frequency module 240 is logically, rather than physically, integrated with the in-band frequency module 230 (e.g., the components can otherwise be logically associated with each other by the network). For example, even having the OOB frequency module 240 physically separated from the in-band frequency module 230, the components may be part of a common subnet so that proximity detection by the OOB frequency module 240 can be associated with proximity to the in-band frequency module.

Some embodiments may provide proximity reports or proximity indication messages configured at the femtocell 125-*a* to indicate proximity of UEs 115 and providing mobile identity to assist in resolving femtocell disambiguation. For example, for active hand-in from macrocells 105 to femtocells 125-*a*, there may be several problems. There may be PCI, PSC, and/or PN Offset confusion as more than one femtocell 125-*a* in the same geographical area (e.g. under same SGSN/MSC 250) may have the same PCI, PSC, and/or PN offset. In addition, there may be problems trying to trigger a UE 115 to conduct an inter-frequency (or intra-frequency) scan to look for a femtocell 125-*a* on a different frequency when serving macrocell 105 signal strength is good.

Problems with femtocell disambiguation and/or triggering frequency scanning may be addressed by several different embodiments. For example, some embodiments may utilize a proximity indication message or proximity report configured with the femtocell 125-*a* that may enable the femtocell 125-*a* to report to the macrocell 105 and/or core network 130-*a* (e.g. MSC for CS calls and SGSN for PS calls) that it has detected a UE 115 in its proximity. This may be mostly systems and/or devices that utilize the 3GPP standard, but may be applicable in other situations also.

The core network 130-*a* may configure the femtocell 125-*a* to generate proximity indication messages. Proximity indication messages may allow the femtocell 125-*a* to send a proximity indication to the macro network 100-*a* whenever a UE 115 enters or leaves its proximity. In some situations, the femtocell 125-*a* may also determine whether the UE 115 is allowed to access services on the femtocell 125-*a* (e.g. checking access control). The proximity detection can be done over an OOB link 270 as discussed above. The OOB link 270 can be a variety of different types of OOB communication including, but not limited to, Bluetooth (both legacy and Low Energy), Zigbee, WiFi etc. The OOB link 270 may be utilized to transfer the UE 115 identity (IMSI etc.) to femtocell 125-*a* once the UE 115 and the femtocell 125-*a* are in proximity.

The UE 115 identifier (e.g. IMSI etc.), femtocell 125-*a* identifier (e.g. PSC etc.), and femtocell 125-*a* frequency and/or other relevant information may be included in the proximity indication message. It may be noted that the macro RNC 120-*a* identity may not need to be sent in the proximity indication message that a femtocell 125-*a* sends as it can be figured out by core network 130-*a* with the UE 115 identifier.

If the UE 115's IMSI is not available, then the femtocell 125-*a* in its proximity indication message may send one or more other identifiers of the UE 115. For example, the proximity indication message may include an OOB identifier of UE 115. The femtocell 125-*a* may determine the OOB identifier, for example, during UE 115 detection over the OOB link. The OOB identifier may include a Bluetooth identifier like BD_ADDR. In some situations, a core network 130-*a* entity, such as a femtocell gateway 140-*a*, may maintain mappings between OOB identifiers and macro identifiers. The core network 130-*a* may then figure out the UE 115's macro identifier, such as its IMSI and thereby the RNC 120 identifier to which the UE 115 is attached. If not, then RNC 120 identifier may be sent by the femtocell 125-*a* as discussed below in more detail.

The macro network 100-*a*, such as at the RNC 120-*a*, upon receiving the proximity indication message from the femtocell 125-*a*, may realize now that the UE 115 is in coverage of the femtocell 125-*a*. As a result, the macro network 100-*a* may direct the UE 115 to perform several different types of actions. The RNC 120-*a* might then do one of the following: direct the UE 115 to do a handover to the femtocell 125-*a*; request that the UE 115 perform one or more measures of the femtocell 125-*a* (e.g., send a measurement control message to the UE 115) and based on the measurements, direct the UE 115 to do a handover to the femtocell 125-*a*; and/or request that the UE 115 read the System Information (SI).

Some embodiments may provide an alternative way of indicating to the controller 120, such as an RNC 120-*a*, and the core network 130-*a* that UE 115 and the femtocell 125-*a* are in proximity using the femtocell 125-*a* and backhaul instead of using a proximity report sent by the UE 115, as may be found with systems and/or devices that may utilize the Release 9 3GPP standards. Embodiments may also include sending the proximity control message all the way to the controller 120, rather than sending it only up to the femtocell gateway 140-*a*. Embodiments may also provide triggers to initiate inter-frequency as well as intra-frequency scans by the UE 115 in search of suitable femtocells 125-*a* when serving macrocell 105 signal strength is good.

Some embodiments may also utilize existing UE 115 registration and femtocell 125-*a* to macrocell 105 outbound handover procedures to address the femtocell ambiguity resolution problem and the triggering of inter-frequency searches at the RNC 120-*a* of the macro network 100-*a*.

For example, after detecting a UE 115 in its proximity using an OOB link, the femtocell 125-*a* may first register the UE 115 with the femtocell gateway 140-*a* by sending a UE 115 registration request message including the UE's OOB identifier and its IMSI to the femtocell gateway 140-*a*. The UE 115's IMSI could be extracted from the UE 115 using an application running on the UE 115 and communicated to the femtocell 125-*a* through the OOB link. When the femtocell gateway 140-*a* receives the registration message, it may register the identifiers in its database.

In some cases, the femtocell gateway 140-*a* may also provide access control by verifying if the UE 115 is allowed on that femtocell 125-*a* or not. If the UE 115 is confirmed to be in the femtocell 125-*a*'s list of subscribers, the femtocell gateway 140-*a* may respond back to the femtocell 125-*a* with a UE registration acceptance message that may include a context ID for that UE 115. In some embodiments, the access control may be performed by the core network 130-*a*.

The UE 115 registration may be initiated with the core network 130-*a* using a dummy identifier, which may be referred to as a "dummy IMSI" in some cases. This dummy identifier could be a unique identifier associated with a UE 115 identifier (e.g. the UE 115's OOB identifier or an "IMSI-like" ID with a unique mapping to the UE 115's IMSI). A mapping between the dummy identifier and the UE 115's IMSI may be required at the RNC 120-*a*. In another embodiment, the dummy identifier could be an "IMSI-like" identifier assigned solely for indication but not attached to any particular UE 115. The use of a dummy identifier at the core network 130-*a* may address the problem that some systems may not support dual UE 115 registration, such as within the same radio access technology (RAT). The registration of the UE 115 at the core network 130 with a dummy identifier may solve this problem.

Once the UE 115 is registered in the core network 130-*a*, the femtocell 125-*a* may then initiate a femtocell-to-macrocell handout procedure by sending a relocation message, as a relocation required message, to the femtocell gateway 140-*a*. The femtocell gateway 140-*a* may then forward the message to other parts of the core network 130-*a*, such as the SGSN/MSC 250. An identifier of the femtocell 125-*a* and an identifier of the target RNC 120-*a* may be included in the relocation message.

Given the target cell identifier of the macrocell 105 that the UE 115 is connected to, the femtocell 125-*a* can typically infer the identifier of the RNC 120-*a* because in most deployed networks, the identifier of the RNC 120-*a* typically is the first 12 bits of the target cell identifier of the macrocell 105. In cases when this is not true, a mapping between the PSC/target cell identifier and the controller identifier might already be stored at the femtocell 125-*a* from previous femtocell-to-macrocell handover procedures. Otherwise, the mapping may be provided to the femtocell 125-*a* by a femtocell management system, for example. The femtocell 125-*a* may derive the PSC and target cell identifier from over the OOB link or from the Network Listen (NL) measurements in the femtocell 125-*a*.

When the core network 130-*a* receives the relocation message, it may derive the UE 115's identifier (in this case, the dummy identifier) using the UE 115's prior registration information and signaling connection information. The core network 130-*a* may include the dummy identifier of the UE 115 and/or other information derived from the relocation message in the relocation request message that it may send to the target RNC 120-*a*.

Upon the reception of the relocation request message with the dummy identifier at the RNC 120-*a*, the RNC 120-*a* may perform different actions. For example, if the dummy identifier (e.g. UE 115's OOB identifier) can be matched with a UE 115's IMSI, the controller 120 may proceed to configure a proximity indication for the UE 115 and/or define compressed mode/measurements gaps for inter-frequency measurements. The frequencies to be searched may be decided by the RNC 120-*a* since the RNC 120-*a* may not be aware of the source femtocell 125-*a*. If the dummy identifier of the UE 115 is an assigned identifier designated by the femtocell 125-*a* and macrocell 105 as a proximity indication flag for an unidentified UE 115, upon the reception of the dummy identifier, the controller 120 may first determine a list of candidate active UEs 115 (using e.g. reported UE signal strengths, UE locations, location of femtocells in the area, etc) and then configure proximity indications and/or compressed-mode/measurement gaps for inter-frequency measurements for those UEs 115. The frequencies to be searched may be decided by the RNC 120-*a* since the controller 120 may not be aware of the source femtocell 125-*a*.

Embodiments may utilize standard-defined messages. However, some behavioral changes may be required at the femtocell 125-*a*, femtocell gateway 140-*a*, and/or the RNC 120-*a* in order to implement different embodiments. For example, the femtocell 125-*a* and/or femtocell gateway 140-*a* may initiate UE 115 registration based on proximity detection. The femtocell 125-*a* and/or femtocell gateway 140-*a* may initiate UE 115 registration with the core network 130-*a* using a dummy identifier. Upon the reception of dummy identifier, the RNC 120-*a* may trigger the appropriate action to facilitate the macrocell-to-femtocell hand-in (e.g. configuring the proximity indication or compress mode/measurement gaps).

No changes may be needed in the core network 130-a or in the UE 115 and the behavioral changes required at the RNC 120-a, the femtocell 125-a, and/or the femtocell gateway 140-a may be implemented by the infrastructure vendors without requiring standardization.

The configuration described in FIG. 2 is intended only to be illustrative, and not limiting. Other configurations are possible for providing the same or similar types of integrative functionality between OOB frequency module 240 and in-frequency module 230. For example, many configurations may allow OOB proximity detection to be used to facilitate for the femtocell 125-a to indicate proximity of UEs 115, to provide mobile identity to assist in resolving femtocell disambiguation, and/or to identify target femtocells 125-a to facilitate hand-ins from the macrocell 105 to the femtocell 125-a.

Figure 3:
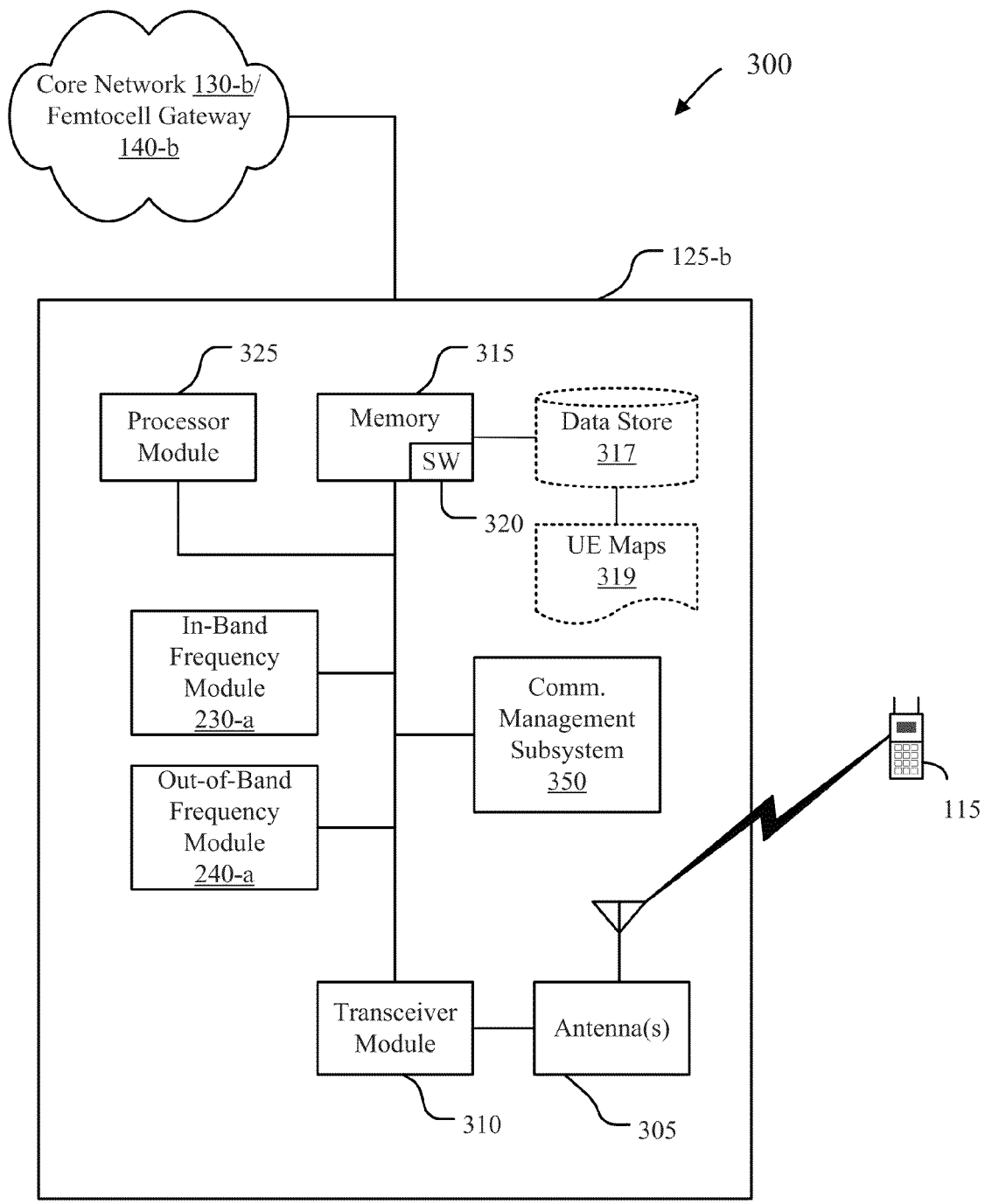
FIG. 3 shows a block diagram of a wireless communications system that includes a femtocell in accordance with various embodiments.

FIG. 3 shows a block diagram of a communications system 300 that may include OOB capabilities. This system 300 may be an example of aspects of the system 101 depicted in FIG. 1 and/or system 200 of FIG. 2. The femtocell 125-b may include an OOB frequency module 240-a, an in-band frequency module 230-a, and/or a communications management subsystem 350. The in-band frequency module 230-a may be a femto Node B and/or radio network controller, as described with reference to FIG. 1 and/or FIG. 2. The femtocell 125-b also may include antennas 305, a transceiver module 310, memory 315, and a processor module 325, which each may be in communication, directly or indirectly, with each other (e.g., over one or more buses). The transceiver module 310 may be configured to communicate bi-directionally, via the antennas 305, with the UEs 115. The transceiver module 310 (and/or other components of the femtocell 125-b) may also be configured to communicate bi-directionally with a macro network 100-a (e.g., a WWAN). For example, the transceiver module 310 may be configured to communicate with the core network 130-b and/or femtocell gateway 140-b.

The memory 315 may include random access memory (RAM) and read-only memory (ROM). In some embodiments, the memory 315 includes (or is in communication with) a data store 317 configured to store UE mappings 319. As described more fully below, these UE mappings 319 may be used to facilitate certain femtocell-assisted hand-in functionality. Typically the UE mappings 319 map an identifier of each UE 115 (e.g., the International Mobile Subscriber Identity (IMSI) associated with the UE 115's SIM card) with an OOB identifier corresponding to the UE 115's OOB radio (e.g., the UE 115's Bluetooth address). In certain embodiments, further mappings are maintained for each UE 115 by the UE mappings 319 including, for example, a public long code mask.

The memory 315 may also store computer-readable, computer-executable software code 320 containing instructions that are configured to, when executed, cause the processor module 325 to perform various functions described herein (e.g., call processing, database management, message routing, etc.). Alternatively, the software 320 may not be directly executable by the processor module 325 but be configured to cause the computer, e.g., when compiled and executed, to perform functions described herein.

The processor module 325 may include an intelligent hardware device, e.g., a central processing unit (CPU) such as those made by Intel® Corporation or AMD®, a microcontroller, an application specific integrated circuit (ASIC), etc. The processor module 325 may include a speech encoder (not shown) configured to receive audio via a microphone, convert the audio into packets (e.g., 30 ms in length) representative of the received audio, provide the audio packets to the transceiver module 310, and provide indications of whether a user is speaking. Alternatively, an encoder may only provide packets to the transceiver module 310, with the provision or withholding/suppression of the packet itself providing the indication of whether a user is speaking.

The transceiver module 310 may include a modem configured to modulate the packets and provide the modulated packets to the antennas 305 for transmission, and to demodulate packets received from the antennas 305. While some examples of the femtocell 125-b may include a single antenna 305, the femtocell 125-b preferably includes multiple antennas 305 for multiple links. For example, one or more links may be used to support macro communications with the UEs 115. Also, one or more out-of-band links may be supported by the same antenna 305 or different antennas 305.

Notably, the femtocell 125-b may be configured to provide both in-band frequency module 230-a and OOB frequency module 240-a functionality. For example, when the UE 115 approaches the femtocell coverage area, the UE 115's OOB radio may begin searching for the OOB frequency module 240-a. In some cases, the OOB frequency module 240-a may page the UE's OOB radio. Upon discovery, the UE 115 may have a high level of confidence that it is in proximity to the femtocell coverage area, and a scan for the in-band frequency module 230-a may commence. Similarly, the OOB frequency module 240-a may be utilized by the femtocell 125-b to determine that a UE 115 is in proximity to the femtocell 125-b.

The scan for the in-band frequency module 230-a may be implemented in different ways. For example, due to the OOB frequency module 240-a discovery by the UE 115's OOB radio, both the UE 115 and the femtocell 125-b may be aware of each other's proximity. The UE 115 may scan for the in-band frequency module 230-a. Alternatively, the in-band frequency module 230-a may poll for the UE 115 (e.g., individually, or as part of a round-robin polling of all registered UEs 115), and the UE 115 may listen for the poll. When the scan for the in-band frequency module 230-a is successful, the UE 115 may attach to the in-band frequency module 230-a.

When the UE 115 is in the femtocell coverage area and is linked to the in-band frequency module 230-a through a communication link, the UE 115 may be in communication with the macro network 100-a via the in-band frequency module 230-a. As described above, the UE 115 may also be a slave of a piconet for which the OOB frequency module 240-a acts as the master. For example, the piconet may operate using Bluetooth and may include Bluetooth communications links facilitated by a Bluetooth radio (e.g., implemented as part of the transceiver module 310) in the in-band frequency module 230-a.

Examples of the in-band frequency module 230-a have various configurations of base station or wireless access point equipment. As used herein, the in-band frequency module 230-a may be a device that communicates with various terminals (e.g., client devices (UEs 115, etc.), proximity agent devices, etc.) and may also be referred to as, and include some or all the functionality of, a base station, a Node B, Home Node B, and/or other similar devices. Although referred to herein as the in-band frequency module 230-a, the concepts herein are applicable to access point configurations other than femtocell configuration (e.g., picocells, microcells, etc.). Examples of the in-band frequency module 230-a utilize communication frequencies and protocols native to a corresponding cellular network (e.g., the macro network 100-*a*, or a portion thereof) to facilitate communication within a femtocell coverage area associated with the in-band frequency module 230-*a* (e.g., to provide improved coverage of an area, to provide increased capacity, to provide increased bandwidth, etc.).

The in-band frequency module 230-*a* may be in communication with other interfaces not explicitly shown in FIG. 3. For example, the in-band frequency module 230-*a* may be in communication with a native cellular interface as part of the transceiver module 310 (e.g., a specialized transceiver utilizing cellular network communication techniques that may consume relatively large amounts of power in operation) for communicating with various appropriately configured devices, such as the UE 115, through a native cellular wireless link (e.g., an "in-band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the in-band frequency module 230-*a* may be in communication with one or more backend network interfaces as part of the transceiver module 310 (e.g., a backhaul interface providing communication via the Internet, a packet switched network, a switched network, a radio network, a control network, a wired link, and/or the like) for communicating with various devices or other networks.

As described above, the in-band frequency module 230-*a* may further be in communication with one or more OOB interfaces as part of the transceiver module 310 and/or the OOB frequency module 240-*a*. For example, the OOB interfaces may include transceivers that consume relatively low amounts of power in operation and/or may cause less interference in the in-band spectrum with respect to the in-band transceivers. Such an OOB interface may be utilized according to embodiments to provide low power wireless communications with respect to various appropriately configured devices, such as an OOB radio of the UE 115. The OOB interface may, for example, provide a Bluetooth link, an ultra-wideband (UWB) link, an IEEE 802.11 (WLAN) link, etc.

OOB devices (e.g OOB frequency module 240-*a*) may simply consume less power than native cellular interface (e.g., for macro WWAN communications) for a given time of operation. In some implementations, OOB interfaces also provide relatively lower bandwidth communications, relatively shorter range communication, and/or consume relatively lower power in comparison to the macro communications interfaces. There is no limitation that the OOB devices and interfaces be low power, short range, and/or low bandwidth. Devices may use any suitable out-of-band link, whether wireless or otherwise, such as IEEE 802.11, Bluetooth, PEANUT, UWB, ZigBee, an IP tunnel, a wired link, etc. Moreover, devices may utilize virtual OOB links, such as through use of IP based mechanisms over a wireless wide area network (WWAN) link (e.g., IP tunnel over a WWAN link) that acts as a virtual OOB link.

OOB frequency module 240-*a* may provide various types of OOB functionality and may be implemented in various ways. An OOB frequency module 240-*a* may have any of various configurations, such as a stand-alone processor-based system, a processor-based system integrated with a host device (e.g., access point, gateway, router, switch, repeater, hub, concentrator, etc.), etc. For example, the OOB frequency module 240-*a* may include various types of interfaces for facilitating various types of communications. In some embodiments, the OOB frequency module 240-*a* may be referred to as a femto-proxy module.

Some OOB frequency module 240-*a* include one or more OOB interfaces as part of the transceiver module 310 (e.g., a transceiver that may consume relatively low amounts of power in operation and/or may cause less interference than in the in-band spectrum) for communicating with other appropriately configured devices (e.g., a UE 115) for providing interference mitigation and/or femtocell selection herein through a wireless link. One example of a suitable communication interface is a Bluetooth-compliant transceiver that uses a time-division duplex (TDD) scheme.

OOB frequency module 240-*a* may also include one or more backend network interfaces as part of the transceiver module 310 (e.g., packet switched network interface, switched network interface, radio network interface, control network interface, a wired link, and/or the like) for communicating with various devices or networks. An OOB frequency module 240-*a* that is integrated within a host device, such as with in-band frequency module 230-*a*, may utilize an internal bus or other such communication interface in the alternative to a backend network interface to provide communications between the OOB frequency module 240-*a* and other devices, if desired. Additionally or alternatively, other interfaces, such as OOB interfaces, native cellular interfaces, etc., may be utilized to provide communication between the OOB frequency module 240-*a* and the in-band frequency module 230-*a* and/or other devices or networks.

Various communications functions (e.g., including those of the in-band frequency module 230-*a* and/or the OOB frequency module 240-*a*) may be managed using the communications management subsystem 350. For example, the communications management subsystem 350 may at least partially handle communications with the macro (e.g., WWAN) network, one or more OOB networks (e.g., piconets, UE 115 OOB radios, other femto-proxies, OOB beacons, etc.), one or more other femtocells (e.g., in-band frequency module 230-*a*), UEs 115, etc. For example, the communications management subsystem 350 may be a component of the femtocell 125-*b* in communication with some or all of the other components of the femtocell 125-*b* via a bus.

Various other architectures are possible other than those illustrated by FIG. 3. The in-band frequency module 230-*a* and/or the OOB frequency module 240-*a* may or may not be collocated, integrated into a single device, configured to share components, etc. For example, the femtocell 125-*b* of FIG. 3 has an integrated in-band frequency module 230-*a* and OOB frequency module 240-*a* that at least partially share components, including the antennas 305, the transceiver module 310, the memory 315, and the processor module 325.

The components of the femtocell 125-*b* may, individually or collectively, be implemented, in whole or in part, with instructions embodied in a memory, formatted to be executed by one or more general or application-specific processors. They may also be implemented with one or more application specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

Some embodiments of femtocell 125-*b* may include different configurations. For example, femtocell 125-*b* may include the OOB frequency module 240-*a* and the in-band frequency module 230-*a*, each with its own antenna 305, transceiver module 310, memory 315, and processor module 325. Both transceiver modules 310 may be configured to communicate bi-directionally, via their respective antennas 305, with UEs 115.

The in-band frequency module 230-a of FIG. 3 is illustrated as providing a communications link only to the macro network 100. However, the in-band frequency module 230-a may provide communications functionality via many different types of networks and/or topologies. For example, the in-band frequency module 230-a may provide a wireless interface for a cellular telephone network, a cellular data network, a local area network (LAN), a metropolitan area network (MAN), a wide area network (WAN), the public switched telephone network (PSTN), the Internet, etc.

Embodiments may include configurations of femtocell 125-b to indicate proximity of UEs 115 and/or to provide mobile identity to assist in resolving femtocell disambiguation. Embodiments may also identify target femtocells 125-b to facilitate hand-ins from the macrocell 105 to the femtocell 125-b. For example, in some embodiments, as discussed above, a femtocell 125, such as femtocell 125-b, may detect a UE 115 in its proximity over an OOB link. The femtocell 125-b may then transmit a proximity indication message through the femtocell gateway 140-b and the core network 130-b, which may then forward the proximity indication message to the a macro network, including a controller of a macro network, such as macro network 100/controller 120 of FIG. 1 and/or macro network 100-a/RNC 120-a of FIG. 2, for example. The proximity indication message may include an identifier of the UE 115, an identifier of the femtocell 125-b, and/or a frequency of the femtocell 125-b.

In other embodiments, the femtocell 125-b, after detecting a UE 115 over an OOB link, may register the UE 115 with the femtocell gateway 140-b. This registration may include a macro identifier (e.g. IMSI) of the UE 115 and/or an OOB identifier of the UE 115. The UE 115 may then be registered at the core network 130-b utilizing a dummy identifier as discussed more thoroughly above.

Figure 4:
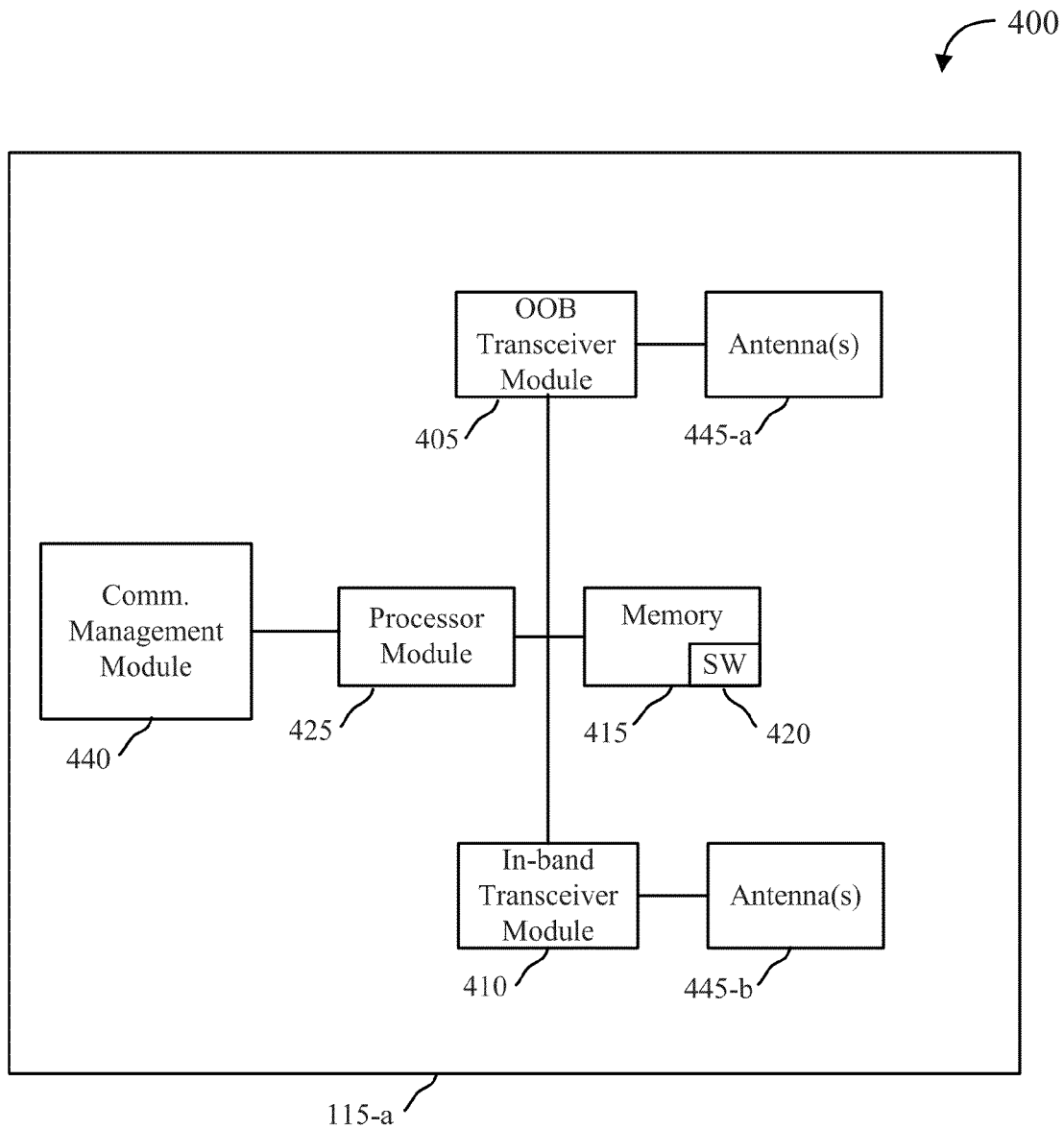
FIG. 4 shows a block diagram of an example of a user equipment in accordance with various embodiments.

As described also above, the femtocell 125 may be configured to communicate with client devices, including the UEs 115. FIG. 4 shows a block diagram 400 of mobile user equipment (UE) 115-a for use with the femtocell 125 of FIGS. 2 and/or 3 in the context of the communications systems and networks of FIGS. 1-3. The UE 115-a may have any of various configurations, such as personal computers (e.g., laptop computers, net book computers, tablet computers, etc.), cellular telephones, PDAs, digital video recorders (DVRs), internet appliances, gaming consoles, e-readers, etc. For the purpose of clarity, the UE 115-a is assumed to be provided in a mobile configuration, having an internal power supply (not shown), such as a small battery, to facilitate mobile operation.

The UE 115-a may include antennas 445, an in-band transceiver module 410, an OOB transceiver module 405, memory 415, and a processor module 425, which each may be in communication, directly or indirectly, with each other (e.g., via one or more buses). The transceiver modules 405, 410 may be configured to communicate bi-directionally, via the antennas 445 with femtocells 125 and macrocells 105. For example, the in-band transceiver module 410 may be configured to communicate bi-directionally with macrocell base stations 105 of FIGS. 1 and/or 2, and/or with the femtocells 125 of FIGS. 1, 2, and/or 3. The OOB transceiver module 405 may be configured to communicate bi-directionally with the femtocell 125 of FIGS. 1, 2, and/or 3 Each transceiver module 405, 410 may include a modem configured to modulate the packets and provide the modulated packets to the antennas 445 for transmission, and to demodulate packets received from the antennas 445. While the UE 115-a may include a single antenna, the UE 115-a will typically include multiple antennas 445 for multiple links.

As generally referenced above, the OOB transceiver module 405 may be configured to communicate with a femtocell over one or more OOB communication links as described in more detail below. The OOB transceiver module 405 at the UE 115-a may include a Bluetooth transceiver for example.

The memory 415 may include random access memory (RAM) and read-only memory (ROM). The memory 415 may store computer-readable, computer-executable software code 420 containing instructions that are configured to, when executed, cause the processor module 425 to perform various functions described herein (e.g., call processing, database management, message routing, etc.). Alternatively, the software 420 may not be directly executable by the processor module 425 but be configured to cause the computer (e.g., when compiled and executed) to perform functions described herein.

The processor module 425 may include an intelligent hardware device, e.g., a central processing unit (CPU) such as those made by Intel® Corporation or AMD®, a microcontroller, an application specific integrated circuit (ASIC), etc. The processor module 425 may include a speech encoder (not shown) configured to receive audio via a microphone, convert the audio into packets (e.g., 30 ms in length) representative of the received audio, provide the audio packets to the in-band transceiver module 410, and provide indications of whether a user is speaking. Alternatively, an encoder may only provide packets to the in-band transceiver module 410, with the provision or withholding/suppression of the packet itself providing the indication of whether a user is speaking.

According to the architecture of FIG. 4, the UE 115-a further includes a communications management module 440. The communications management module 440 may manage communications with a macrocell, femtocell, other UEs 115 (e.g., acting as a master of a secondary piconet), etc. By way of example, the communications management module 440 may be a component of the UE 115-a in communication with some or all of the other components of the UE 115-a via a bus. Alternatively, functionality of the communications management module 440 may be implemented as a component of a transceiver module 405, 410, as a computer program product, and/or as one or more controller elements of the processor module 425.

Some components of the UE 115-a may, individually or collectively, be implemented, in whole or in part, with instructions embodied in a memory, formatted to be executed by one or more general or application-specific processors. They may also be implemented with one or more application specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

In many cases, it is desirable to support active hand-in from a macrocell (e.g., macrocell base stations 105 of FIG. 1) to the femtocell 125 and/or active hand-out from the femtocell 125 to the macrocell base station 105 using handovers to provide seamless voice and data service to active users (active UEs 115). Embodiments may also be configured to provide for the femtocell 125 to indicate proximity of the UE 115-a and/or to provide mobile identity to assist in resolving femtocell disambiguation. Embodiments may also identify target femtocells 125 to facilitate hand-ins from the macrocell 105 to the femtocell 125.

In some embodiments, the UE 115-*a* may move into proximity with a femtocell 125. The UE 115-*a* and/or the femtocell 125 may detect each others presence in a variety of ways as discussed above, including over an OOB link. The UE 115-*a* may transmit one or more identifiers of the UE 115-*a* to the femtocell 125, such as a macro identifier of the UE 115-*a* and/or an OOB identifier of the UE 115-*a*, over the OOB link, from OOB transceiver module 405 through antenna 445-*a*, for example. This information may then be utilized along with the frequency of the femtocell 125 as part of proximity indication message that is routed to a controller 120 of a macro network 100. Once the controller 120 receives the proximity indication message, it may direct the UE 115-*a* to perform different functions, including, but not limited to, directing the UE 115-*a* to perform a handover to the femtocell 125, to perform one or more measurements of the femtocell 125 (and possibly performing a handover to the femtocell 125 based on the measurements, and/or read System Information. The controller 120 may direct the UE 115-*a* to perform these functions through an in-band link between a macrocell 105, associated with the controller 120, and the UE 115-*a*. Thus, the UE 115-*a* may receive this direction through communication through antenna 445-*b* and in-band transceiver module 410. Other embodiments may utilize some similar aspects as those describe above, except that the femtocell 125 may register the UE 115-*a* with a femtocell gateway 140, and the femtocell gateway may register the UE 115-*a* with a core network 130 utilizing a dummy identifier, as discussed more thoroughly herein.

Figure 5:
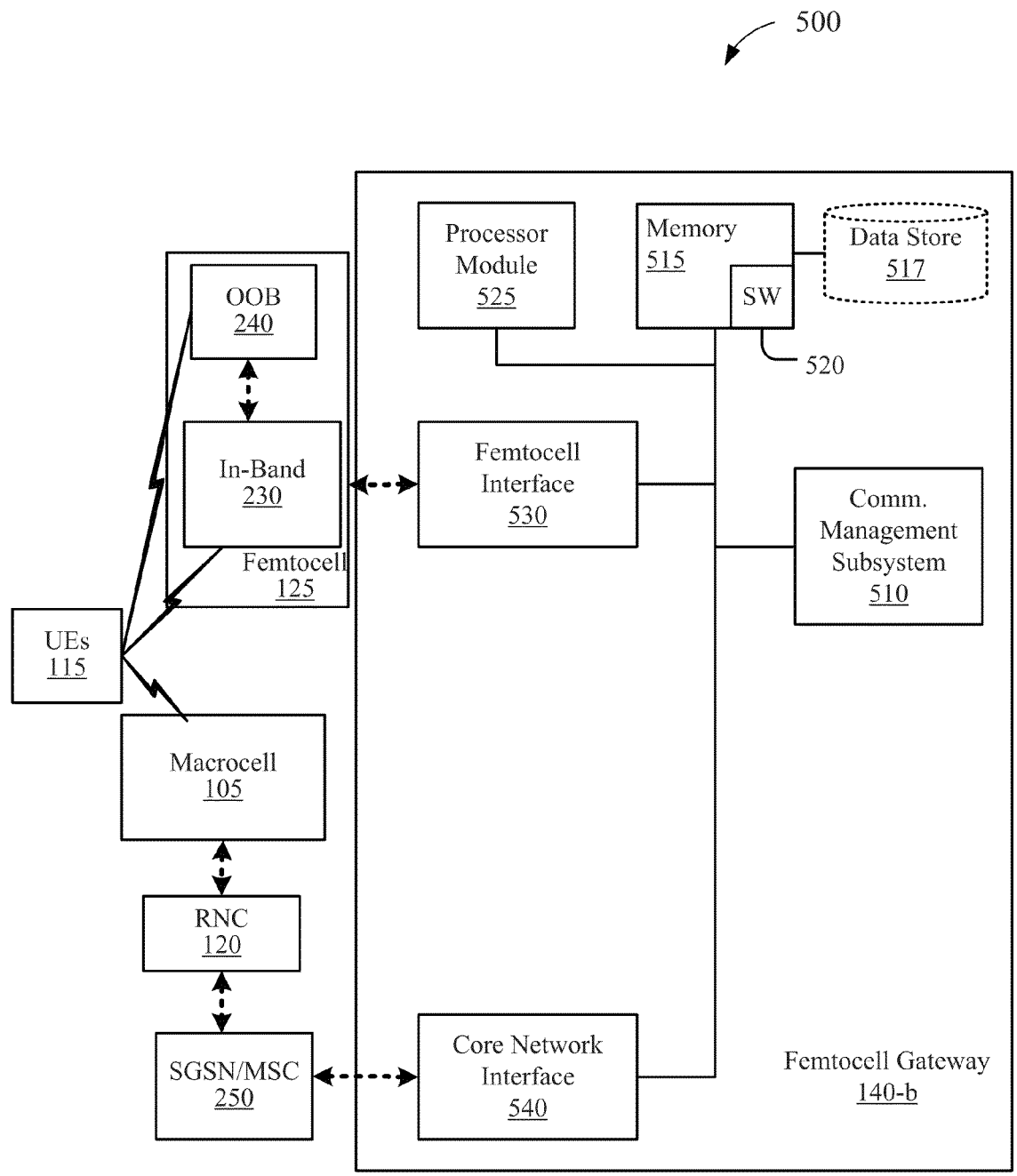
FIG. 5 shows a block diagram of a wireless communications system that includes a femtocell gateway in accordance with various embodiments.

To facilitate a femtocell 125 providing proximity indications of UEs 115 and/or providing mobile identity to assist in resolving femtocell disambiguation, which may assist in providing for hand-in from a macrocell-to-a femtocell, femtocells 125, like the ones described in FIGS. 1, 2, and/or 3, may interact with embodiments of femtocell gateway 140-*b*, such as those described in FIG. 5. FIG. 5 shows a block diagram of a wireless communications system 500 that includes a femtocell gateway 140-*b*. The femtocell gateway 140-*b* may include a communications management subsystem 510, a femtocell interface 530, and/or a core network interface 540. The femtocell gateway 140-*b* also may include memory 515, a data store 517, and/or a processor module 525. All the components of the femtocell gateway 140-*b* may be in communication with each other directly or indirectly (e.g., over one or more buses).

For the sake of context and clarity, the femtocell interface 530 is shown in communication with femtocell 125 (which may include in-band frequency module 230 and OOB frequency module 240), and the core network interface 540 is shown in communication with macrocell base station 105 (via an SGSN/MSC 250 and/or one or more macro RNCs 120). Various communications functions, including those involved in facilitating femtocell 125 assisted hand-in are implemented and/or managed using the communications management subsystem 510. For example, the communications management subsystem 510 may at least partially handle communications with macro network elements using functionality of the core network interface 540 and may at least partially handle communications with femtocell 125 using functionality of the femtocell interface 530. For example, the communications management subsystem 510 may be a component of the femtocell gateway 140-*b* in communication with some or all of the other components of the femtocell gateway 140-*b* via a bus.

The memory 515 may include random access memory (RAM) and read-only memory (ROM). In some embodiments, the memory 515 is configured to maintain registration-related information. As described more fully below, the registration-related information may include identifier mappings for femtocells 125, UEs 115, etc., as well as registration messages, flags, etc.

The memory 515 may also store computer-readable, computer-executable software code 520 containing instructions that are configured to, when executed, cause the processor module 525 to perform various functions described herein (e.g., call processing, database management, message routing, etc.). Alternatively, the software 520 may not be directly executable by the processor module 525 but be configured to cause the computer, e.g., when compiled and executed, to perform functions described herein.

The processor module 525 may include an intelligent hardware device, e.g., a central processing unit (CPU) such as those made by Intel® Corporation or AMD®, a microcontroller, an application specific integrated circuit (ASIC), etc. Embodiments of the processor module 525 may be configured to facilitate functionality, such as timer functionality. Further, embodiments of the processor module 525 include or facilitate some or all of the functionality of the communications management subsystem 510, the femto interface 530, or the core network interface 540.

As discussed above, embodiments of femtocell gateway 140-*b*, such as those described in FIG. 5, can interact with femtocells 125, like the one described in FIGS. 2 and/or 3, to facilitate femtocell 125 assisted hand-in. For example, when a UE 115 approaches a femtocell 125, the femtocell 125 may detect the UE 115 in its proximity using an OOB link (e.g., Bluetooth paging procedure) or vice versa. In addition to or as part of the OOB detection procedure, the femtocell 125 may determine whether the UE 115 is an authorized user. For example, the femtocell 125 may check an access control list to determine whether the UE 115 is authorized to access macro communications services via the femtocell 125.

Having discovered each other (and the femtocell 125 having possibly validated the UE 115 as an authorized user), the femtocell 125 may register the UE 115 with the femtocell gateway 140-*b*. For example, the femtocell 125 may maintain a UE mapping 319 between the UE 115's OOB identifier (e.g., the Bluetooth device address,) detected during the detection procedure and a macro identifier of the UE 115, like the UE 115's IMSI. The femtocell 125 may register the UE 115 with the femtocell gateway 140 according to the UE 115's identifier(s).

In some embodiments, the OOB radio range (e.g., the edge of Bluetooth coverage) may be greater than the femtocell 125 coverage range (for example, the range of the in-band frequency module 230), such that the detection and registration of the UE 115 may be performed before the UE 115 detects the femtocell 125. Thus, in many cases, a, OOB proximity detection or indication may be communicated by the femtocell 125 to the femtocell gateway 140-*b* for the UE 115.

As discussed above, in some embodiments, after detecting a UE 115 in its proximity using an OOB link, the femtocell 125 may first register the UE 115 with the femtocell gateway 140-*b* by sending a UE 115 registration request message including the UE 115's OOB identifier and its IMSI to the femtocell gateway 140-*b*. The UE 115's IMSI could be extracted from the UE 115 using an application running on the UE 115 and communicated to the femtocell 125 through the OOB link. When the femtocell gateway 140-*b* receives the registration message, it may register the identifiers in its data store 517.

In some cases, the femtocell gateway 140-b may also provide access control by verifying if the UE 115 is allowed on that femtocell 125 or not. If the UE 115 is confirmed to be in the femtocell 125's list of subscribers, the femtocell gateway 140-b may respond back to the femtocell 125 with a UE registration acceptance message that may include a context ID for that UE 115. In some embodiments, the access control may be performed by the core network 130.

The UE 115 registration may be initiated with the core network 130 using a dummy identifier, which may be referred as a "dummy IMSI" in some cases. In some embodiments, the femtocell gateway 140-b may transmit the dummy identifier to the other elements of the core network 130, such as the SGSN/MSC 250. This dummy identifier could be a unique identifier associated with a UE 115 identifier (e.g. the UE's OOB identifier or an "IMSI-like" ID with a unique mapping to the UE's IMSI). A mapping between the dummy identifier and the UE's IMSI may be required at the controller 120. In another embodiment, the dummy identifier could be an "IMSI-like" identifier assigned solely for indication but not attached to any particular UE 115. The use of a dummy identifier at the core network 130 may address the problem that some systems and/or may not support dual UE 115 registration within the same radio access technology (RAT). The registration of the UE 115 at the core network 130 with a dummy identifier may solve this problem.

Once the UE 115 is registered in the core network 130, the femtocell 125 may then initiate a femtocell-to-macrocell handout procedure by sending a relocation message, as a relocation required message, to the femtocell gateway 140-b. The femtocell gateway 140-b may then forward the message to other parts of the core network 130, such as the SGSN/MSC 250. An identifier of the femtocell 125 and an identifier of the target controller 120 may be included the relocation message.

Figure 6:
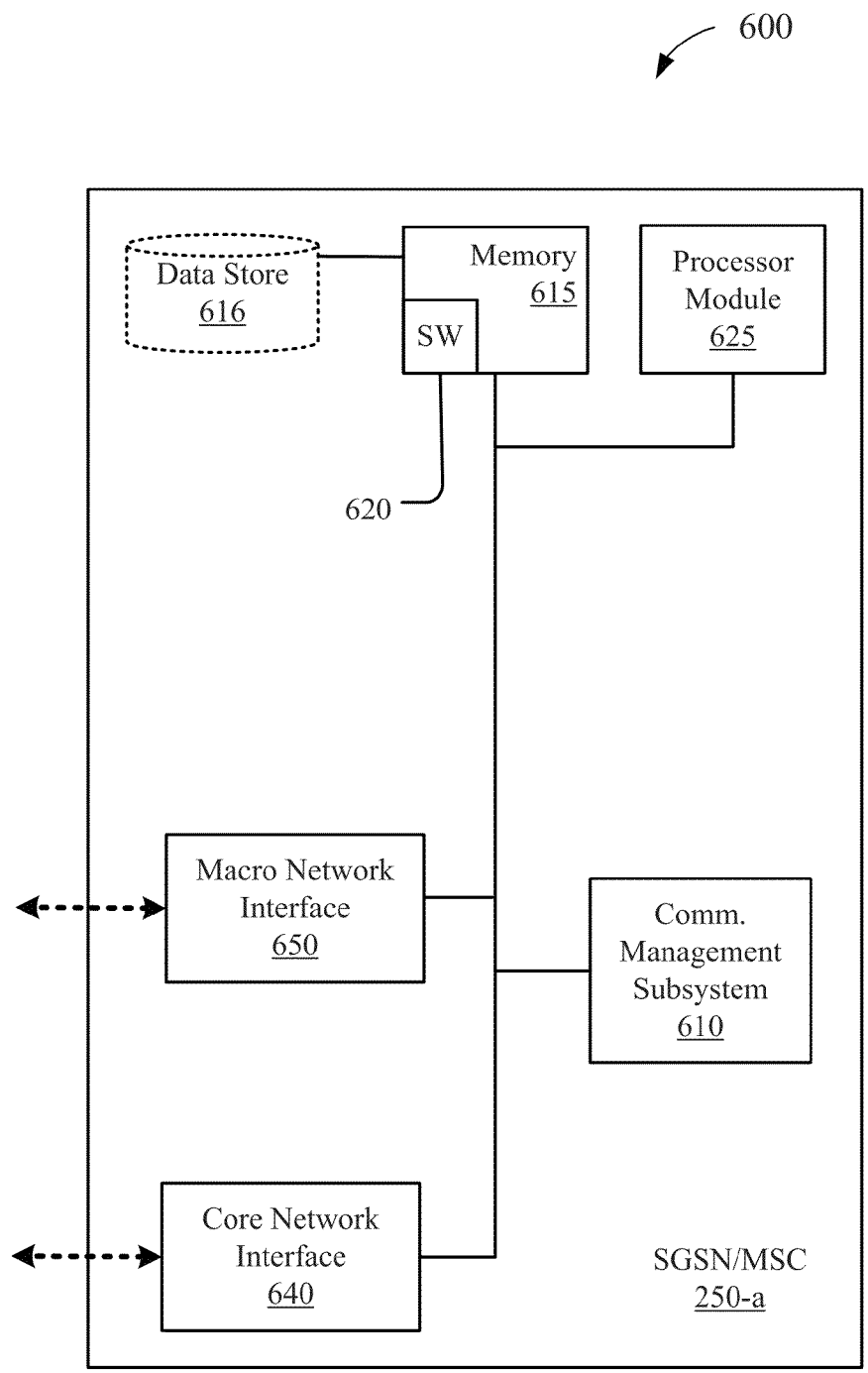
FIG. 6 shows a block diagram of a core network device such as a Mobile Switching Center (MSC) or Serving GPRS Supporting Node (SGSN) in accordance with various embodiments.

FIG. 6 shows a block diagram showing aspects of a core network system 600 that includes a Serving GPRS Support Node (SGSN) or Mobile Switching Center (MSC) 250-a. SGSN/MSC 250-a may be utilized in networks such as the core network 130 of FIG. 1, the SGSN/MSC 250 of core network 130-a of FIG. 2, and/or the SGSN/MSC 250 of FIG. 5, for example. The SGSN/MSC 250-a may include a communications management subsystem 610, a core network interface 640, and/or a macro network interface 650. The SGSN/MSC 250-a also may include memory 615, a data store 616, and/or a processor module 625. All the components of the SGSN/MSC 250-a may be in communication with each other directly or indirectly (e.g., over one or more buses).

The macro network interface 650 may be in communication with macro network systems and/or devices, such as controller 120 of FIG. 1, the RNC 120 and/or macrocell 105 of macro network 100-a of FIG. 2, for example. The core network interface 640 may be in communication with other core network systems and/or devices, such as the gateway 140 of FIG. 1, the femtocell gateway 140-a of core network 130-a of FIG. 2, and/or the femtocell gateway 140-g of FIG. 5. Various communications functions, including those involved in facilitating femtocell 125 assisted hand-in, providing for the femtocell 125 to indicate proximity of UEs 115, and/or providing for mobile identity to assist in resolving femtocell disambiguation may be implemented and/or managed using the communications management subsystem 610

For example, the communications management subsystem 610 may at least partially handle communications with macro network elements using functionality of the macro network interface 650 and may at least partially handle communications with other core network elements using functionality of the core network interface 640. For example, the communications management subsystem 610 may be a component of the SGSN/MSC 250-a in communication with some or all of the other components of the SGSN/MSC 250-a via a bus.

The memory 615 and/or the data store 616 may include random access memory (RAM) and read-only memory (ROM). In some embodiments, the memory 615 and/or data store may be configured to maintain registration-related information. For example, in some embodiments, the memory 615 and/or data store 616 may include mappings between UE 115's OOB identifiers (e.g. BD_ADDR) and macro identifiers (e.g. IMSI). The memory 615 and/or data store 616 may also include dummy identifiers associated with different UEs 115 that may be registered at the core network 130 at the SGSN/MSC 250-a. As described more fully below, the registration-related information may include identifier mappings for femtocells 125, UEs 115, etc., as well as registration messages, flags, etc.

The memory 615 and/or the data store may also store computer-readable, computer-executable software code 620 containing instructions that are configured to, when executed, cause the processor module 625 to perform various functions described herein (e.g., call processing, database management, message routing, etc.). Alternatively, the software 620 may not be directly executable by the processor module 625 but be configured to cause the computer, e.g., when compiled and executed, to perform functions described herein.

The processor module 625 may include an intelligent hardware device, e.g., a central processing unit (CPU) such as those made by Intel® Corporation or AMD®, a microcontroller, an application specific integrated circuit (ASIC), etc. Embodiments of the processor module 625 may be configured to facilitate functionality, such as timer functionality. Further, embodiments of the processor module 625 include or facilitate some or all of the functionality of the communications management subsystem 610, the core network interface 640, or the macro network interface 650.

In some embodiments, the SGSN/MSC 250-a may utilize its mappings between OOB identifiers and macro identifiers for respective UEs 115. SGSN/MSC 250-a may then figure out the UE 115's macro identifier, such as its IMSI and thereby the RNC 120 identifier to which the UE 115 is attached.

As discussed above, in some embodiments, UE 115 registration may be initiated with the core network 130, which may utilize SGSN/MSC 250-a, using a dummy identifier. The use of a dummy identifier at the core network 130, such as at the SGSN/MSC 250-a, may address the problem that some systems and/or may not support dual UE 115 registration within the same radio access technology (RAT). The registration of the UE 115 at the core network 130, such as at the SGSN/MSC 250-a, with a dummy identifier may solve this problem.

Once the UE 115 is registered in the core network 130, such as at the SGSN/MSC 250-a, the femtocell 125 may then initiate a femtocell-to-macrocell handout procedure by sending a relocation message, as a relocation required message, to the femtocell gateway 140. The femtocell gateway 140 may then forward the message to other parts of the core network 130, such as the SGSN/MSC 250-a. An identifier of the femtocell 125 and an identifier of the target controller 120 may be included the relocation message.

When the core network 130, such as with the SGSN/MSC 250-a, receives the relocation message, it may derive the UE's identifier (in this case, the dummy identifier) using the UE's prior registration information and signaling connection information, which may be stored in the memory 615 and/or data store 616. The core network 130, such as at the SGSN/

MSC 250-*a*, may include the dummy identifier of the UE 115 and/or other information derived from the relocation message in the relocation request message that it may send to the target controller 120.

Figure 7:
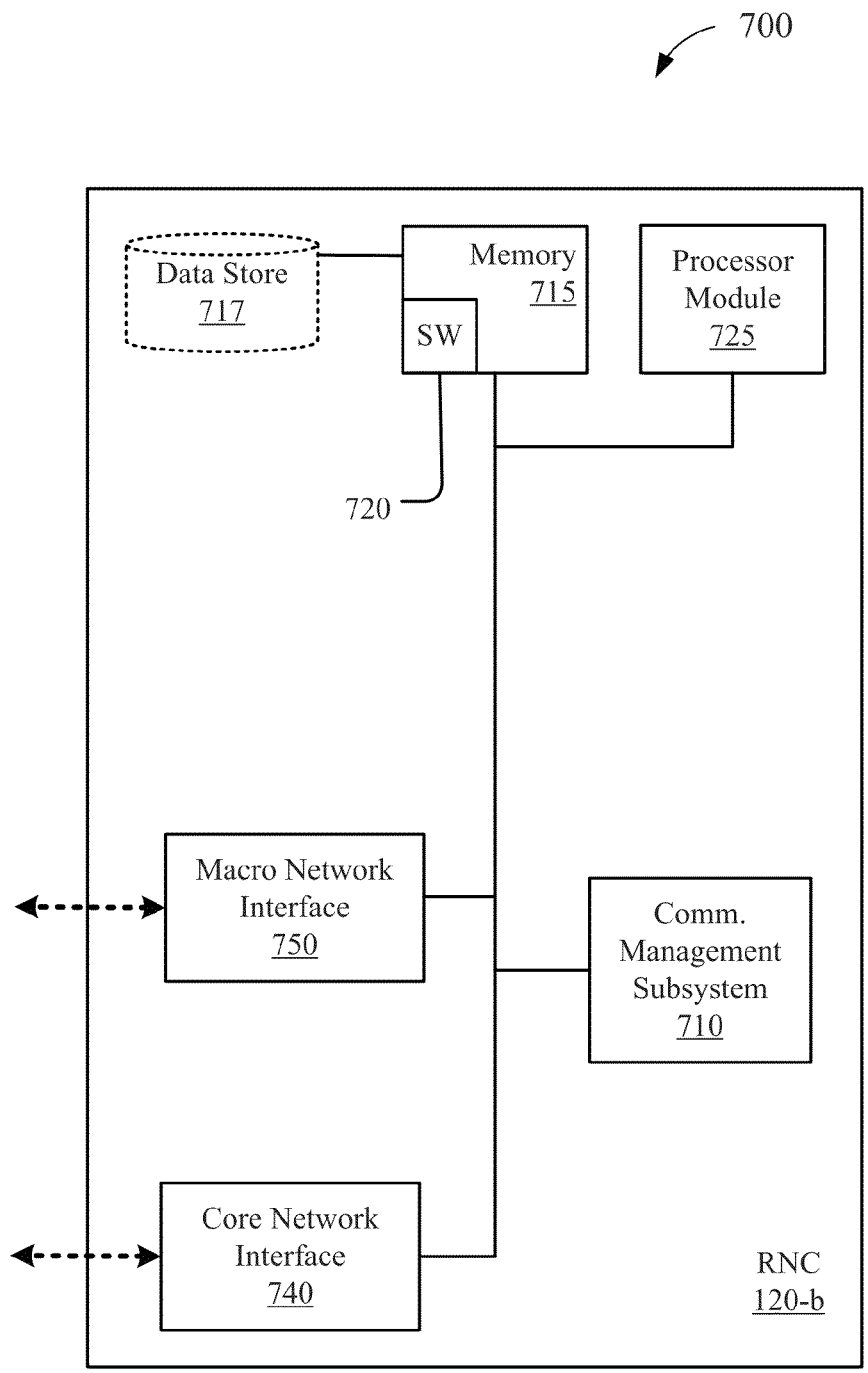
FIG. 7 shows a block diagram of a macro network controller such as a Radio Network Controller (RNC) in accordance with various embodiments.

FIG. 7 shows a block diagram of aspects of a macro network 700 that includes a controller RNC 120-*b*. RNC 120-*b* may be utilized in networks such as network 100 of FIG. 1 as controller 120, as RNC 120-*a* of macro network 100-*a* of FIG. 2, and/or as RNC 120 of FIG. 5. The RNC 120-*b* may include a communications management subsystem 710, a core network interface 740, and/or a macro network interface 750. The RNC 120-*b* also may include a memory 715, a data store 717, and/or a processor module 725. All the components of the RNC 120-*b* may be in communication with each other directly or indirectly (e.g., over one or more buses).

The macro network interface 750 may be in communication with macro network systems and/or devices, such as a macrocell 105 of FIG. 1, macrocell 105 of macro network 100-*a* of FIG. 2, and/or macrocell 105 of FIG. 5, for example. The macro network interface 750 may also be in communication with UEs 115 through a macrocell 105. The core network interface 740 may be in communication with core network systems and/or devices, such as SGSN/MSC 250 of core network 130-*a* of FIG. 2, SGSN/MSC 250 of FIG. 5, and/or SGSN/MSC 250-*a* of FIG. 6. Various communications functions, including those involved in facilitating femtocell 125 assisted hand-in, providing for the femtocell 125 to indicate proximity of UEs 115, and/or providing for mobile identity to assist in resolving femtocell disambiguation may be implemented and/or managed using the communications management subsystem 710. For example, the communications management subsystem 710 may at least partially handle communications with macro network elements using functionality of the core network interface 740 and may at least partially handle communications with other core network elements using functionality of the core network interface 740. For example, the communications management subsystem 710 may be a component of the RNC 120-*b* in communication with some or all of the other components of the RNC 120-*b* via a bus.

The memory 715 and/or data store 717 may include random access memory (RAM) and read-only memory (ROM). In some embodiments, the memory 715 and/or data store may be configured to maintain registration-related information. For example, in some embodiments, the memory 715 and/or data store 717 may include mappings between UE 115's OOB identifiers (e.g. BD_ADDR) and macro identifiers (e.g. IMSI). The memory 715 and/or data store 717 may also include dummy identifiers associated with different UEs 115 that may be registered at the macro network 130 at the RNC 120-*b*. The registration-related information may include identifier mappings for femtocells 125, UEs 115, etc., as well as registration messages, flags, etc.

The memory 715 and/or data store 717 may also store computer-readable, computer-executable software code 720 containing instructions that are configured to, when executed, cause the processor module 725 to perform various functions described herein (e.g., call processing, database management, message routing, etc.). Alternatively, the software 720 may not be directly executable by the processor module 725 but be configured to cause the computer, e.g., when compiled and executed, to perform functions described herein.

The processor module 725 may include an intelligent hardware device, e.g., a central processing unit (CPU) such as those made by Intel® Corporation or AMD®, a microcontroller, an application specific integrated circuit (ASIC), etc. Embodiments of the processor module 725 may be configured to facilitate functionality, such as timer functionality. Further, embodiments of the processor module 725 include or facilitate some or all of the functionality of the communications management subsystem 710, the core network interface 740, or the macro network interface 750.

In some embodiments, the RNC 120-*b*, upon receiving the proximity indication message from the femtocell 125, may realize now that the UE 115 is in coverage of the femtocell 125. As a result, the RNC 120-*b* may direct the UE 115 to perform several different types of actions. The RNC 120-*b* might then do one of the following: direct the UE 115 to do a handover to the femtocell 125; request that the UE 115 perform one or more measures of the femtocell 125 (e.g., send a measurement control message to the UE 115) and based on the measurements, direct the UE 115 to do a handover to the femtocell 125; and/or request that the UE 115 read the System Information (SI). The RNC 120-*b* may also direct the UE 115 to perform other actions as part of a hand-in from the macrocell 105 to the femtocell 125.

In some embodiments, upon reception of a relocation request message with a dummy identifier, the RNC 120-*b* may perform different actions. For example, if the dummy identifier (e.g. UE 115's OOB identifier) can be matched with a UE 115's IMSI, the RNC 120-*b* may proceed to configure a proximity indication for the UE 115 and/or define compressed mode/measurements gaps for inter-frequency measurements. The frequencies to be searched may be decided by the RNC 120-*b* since the RNC 120-*b* may not be aware of the source femtocell 125. If the dummy identifier of the UE 115 is an assigned identifier designated by the femtocell 125 and the macrocell 105 as a proximity indication flag for an unidentified UE, upon the reception of the dummy identifier, the RNC 120-*b* may first determine a list of candidate active UEs 115 (using e.g. reported UE signal strengths, UE locations, location of femtocells in the area, etc) and then configures proximity indications and/or compressed-mode/measurement gaps for inter-frequency measurements for those UEs 115. The frequencies to be searched may be decided by the RNC 120-*b* since the RNC 120-*b* may not be aware of the source femtocell 125. The RNC 120-*b* may direct the UEs 115 to perform other actions including, but not limited to, directing the UE 115 to: do a handover to the femtocell 125; perform measurements of the femtocell 125 (and possibly directing the UE 115 to perform a handover to the femtocell 125 based on those measurements); and/or read the system information (SI). RNC 120-*b* may also direct the UEs 115 to perform intra-frequency scans of the femtocells 125 in some cases.

Figure 8A:
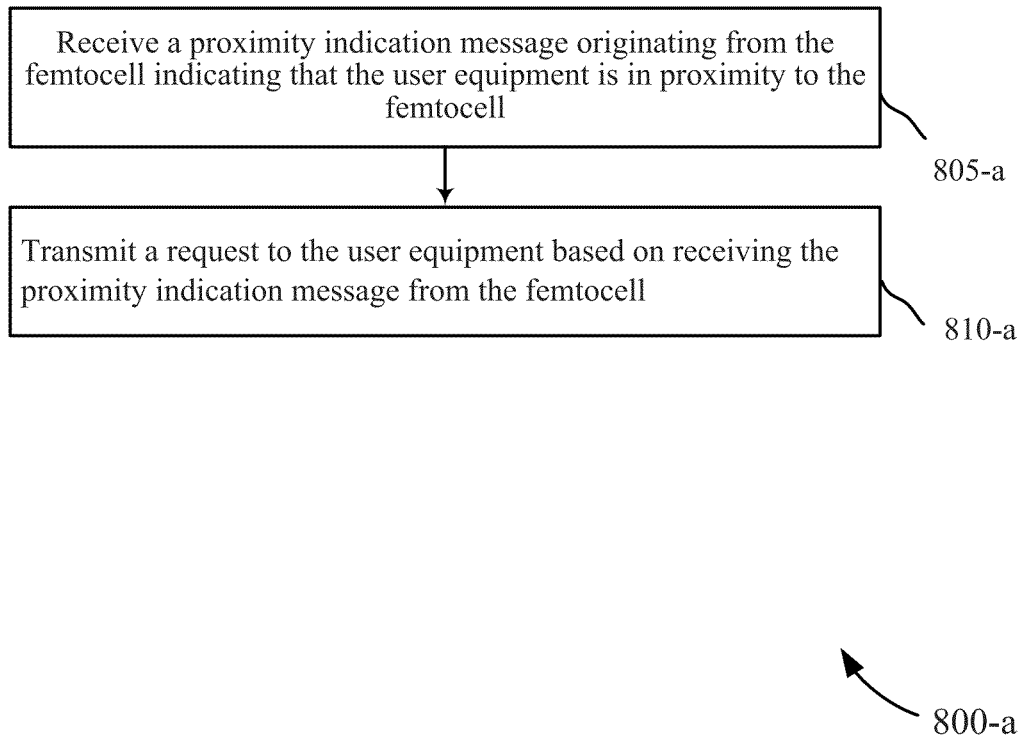
FIG. 8A shows a flow diagram of a method for utilizing a proximity indication message from a femtocell in accordance with various embodiments.

Turning to FIG. 8A, a flowchart illustrating a method 800-*a* for utilizing a proximity indication message from a femtocell regarding a UE 115 in accordance with various embodiments. The method 800-*a* may be performed by a macro network 100 device or system, such as controller 120 of FIG. 1, RNC 120-*a* of FIG. 2, RNC 120 of FIG. 5, and/or RNC 120-*b* of FIG. 7, for example.

At block 805-*a*, the proximity indication message originating from the femtocell may be received at a macro network 100, such as at a macro controller such as RNC 120. In some cases, the proximity indication message originating from the femtocell 125 may pass through different network elements such as core network 130 elements such as a femtocell gateway 140 and/or SGSN/MSC 250. The proximity indication message may indicate that the UE 115 is in proximity to the femtocell 125. At block 810-*a*, a request may be transmitted from the macro network to the UE 115 based on receiving the proximity indication message from the femtocell 125.

Figure 8B:
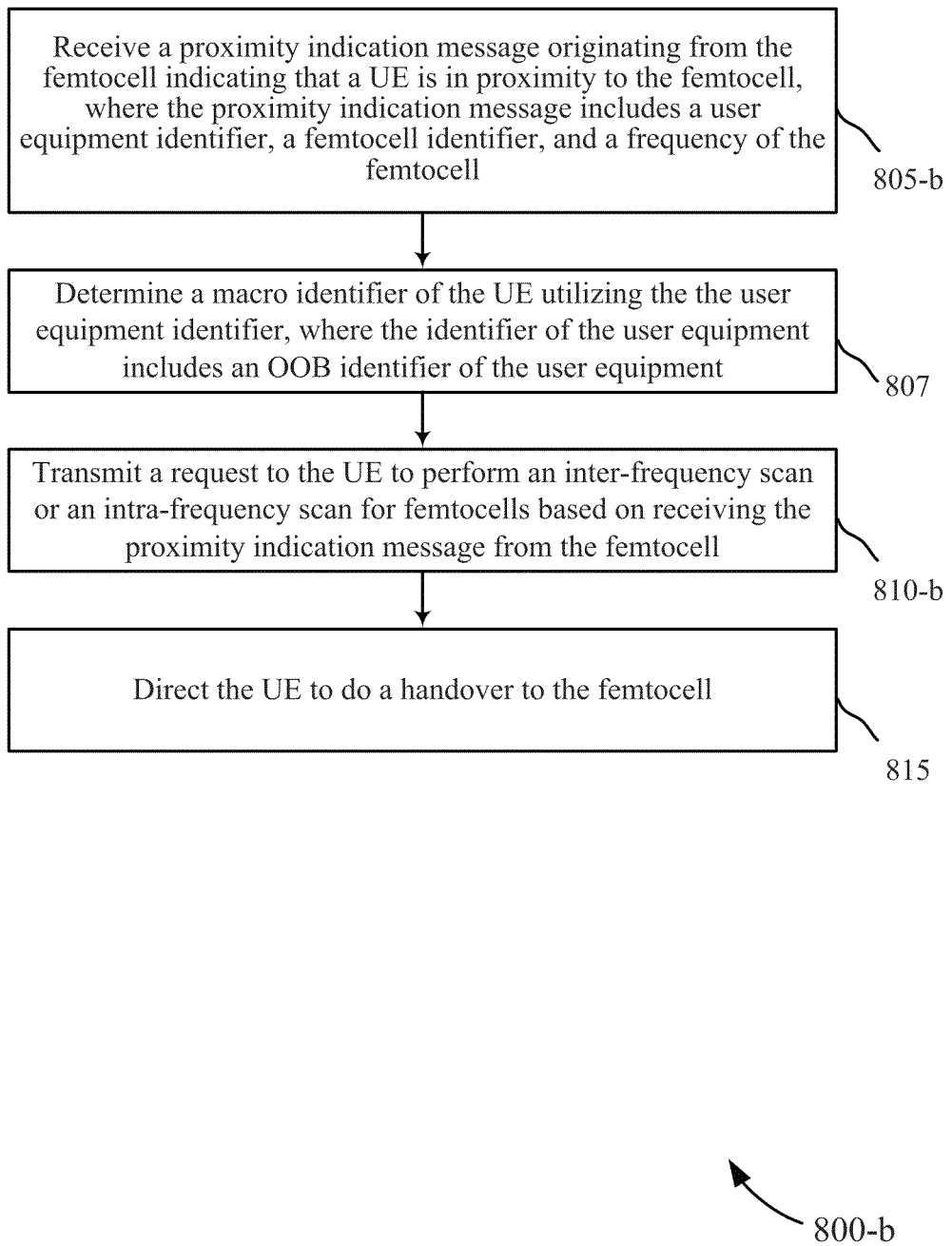
FIG. 8B shows a flow diagram of a method for utilizing a proximity indication message from a femtocell in accordance with various embodiments.

Turning to FIG. 8B, a flowchart illustrating a method 800-*b* for utilizing a proximity indication message from a femtocell 125 regarding a UE 115 in accordance with various embodiments. The method 800-*b* may be performed by a macro network 100 device or system, such as controller 120 of FIG. 1, RNC 120-*a* of FIG. 2, RNC 120 of FIG. 5, and/or RNC 120-*b* of FIG. 7, for example. The method 800-*b* may be an example of the method 800-*a* of FIG. 8A.

At block 805-*b*, the proximity indication message originating from the femtocell 125 may be received at a macro network 100, such as at a macro controller RNC 120. The proximity indication message may include an identifier of the user equipment 115, an identifier of the femtocell 125, and a frequency of the femtocell 125. In some cases, the proximity indication message originating from the femtocell 125 may pass through different network elements such as core network 130 elements, and such as a femtocell gateway 140 and/or SGSN/MSC 250. The proximity indication message may indicate that the UE 115 is in proximity to the femtocell 125. At block 807, a macro identifier of the UE 115 may be determined utilizing the identifier of the user equipment 115. The identifier of the UE 115 may include an OOB identifier of the UE 115. At block 810-*b*, a request may be transmitted from the macro network 100 to the UE 115 based on receiving the proximity indication message from the femtocell 125. At block 815, the UE 115 may be directed by the macro network 100 to do a handover to the femtocell.

The request transmitted to the UE 115 may direct the UE 115 to do a handover to the femtocell 125. The request transmitted to the UE 115 may direct the UE 115 to perform one or more measurements of the femtocell. Based on those measurements, the UE 115 may be further directed to do a handover to the femtocell.

In some cases, the request transmitted to the UE 115 may direct the UE 115 to read system information of the femtocell 125. The request transmitted to the UE 115 may direct the UE 115 to perform an inter-frequency scan for one or more femtocells 125. The request transmitted to the UE 115 may direct the UE 115 to perform an intra-frequency scan for one or more femtocells 125.

The request transmitted to the UE 115 may occur when a signal strength between the UE 115 and a macrocell 105 is good. For example, the request may be transmitted during a time period when normally the signal strength between the UE 115 and a macrocell 105 is such that the macro network 100 may not consider performing a handover to a femtocell 125.

Figure 9:
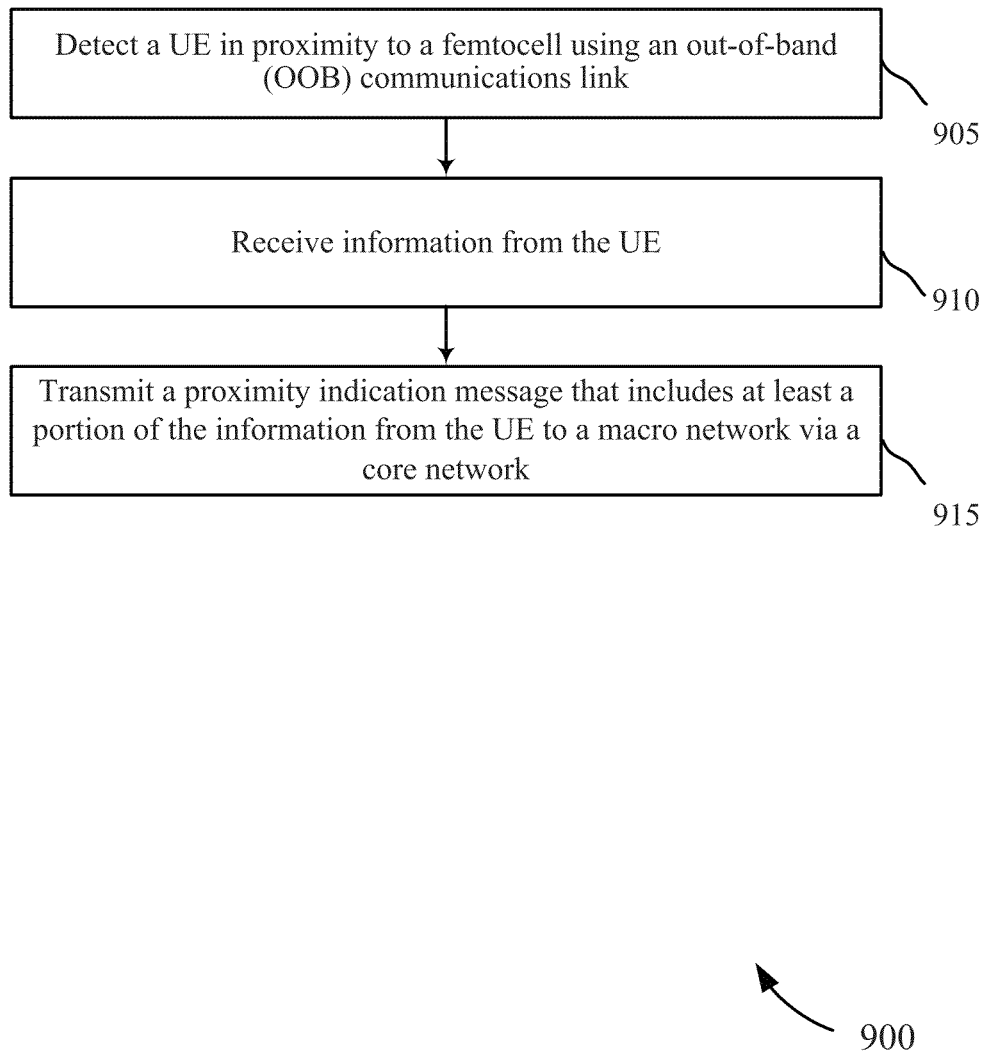
FIG. 9 shows a flow diagram of a method for a femtocell to indicate proximity of a user equipment in accordance with various embodiments.

Turning to FIG. 9, a flowchart illustrating a method 900 for a femtocell to indicate proximity of a UE 115 in accordance with various embodiments. The method 900 may be performed by the femtocell 125 of FIG. 1, the femtocell 125-*a* of FIG. 2, the femtocell 125-*b* of FIG. 3, and/or the femtocell 125 of FIG. 5, for example.

At block 905, the UE 115 may be detected in proximity to the femtocell 125 using an out-of-band (OOB) communications link. At block 910, information from the UE 115 may be received. This information may include an identifier of the UE 115, such as international mobile subscriber identity (IMSI) of the UE 115. At block 915, a proximity indication message that includes at least a portion of the information from the UE 115 may be transmitted to a macro network 100 via a core network 130. The proximity indication message may be referred to as a proximity report in some situations.

The proximity indication message may identify the UE 115 and the femtocell 125 in some cases. For example, the proximity indication message may include an identifier of the UE 115, an identifier of the femtocell 125, and a frequency of the femtocell 125. The UE 115 identifier may include an IMSI of the UE 115. The UE 115 identifier may include an OOB identifier of the UE 115. The femtocell 125 identifier may include a primary scrambling code (PSC) of the femtocell 125 in some cases. Other identifiers of the UE 115 and/or femtocell 125 may also be utilized as part of the proximity indication message.

Figure 10:
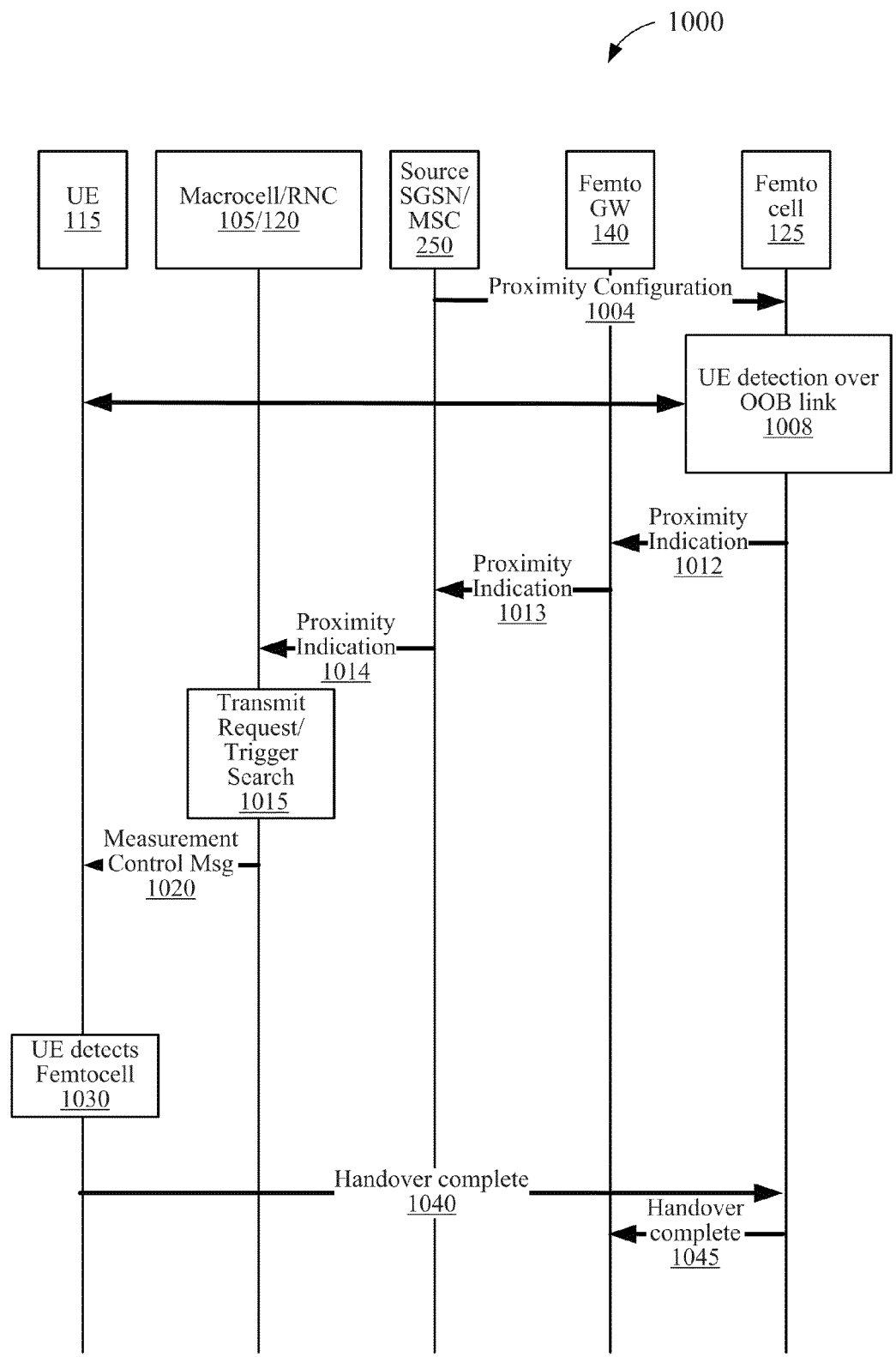
FIG. 10 shows a call flow diagram illustrating the use of a proximity indication message in accordance with various embodiments.

A call flow diagram 1000 illustrating the use of a proximity indication message according to methods 800-*a* of FIG. 8A, 800-*b* of FIG. 8B, and/or 900 of FIG. 9 is shown in FIG. 10. The call flow diagram 1000 shows communications between a UE 115, a currently connected (source) macrocell 105, an RNC 120, a source SGSN/MSC 250, a target femtocell gateway 140, and a target femtocell 125. For the sake of avoiding excess detail, the signaling between source macrocell 105 in communication with a macro RNC 120, is not shown.

The call flow diagram 1000 may begin at block 1004, where source SGSN/MSC 250 may transmit to femtocell 125 proximity configuration information, such that femtocell may configure proximity indication messages in accordance with various embodiments. Note that the message 1004 may be sent to configure a femtocell 125 to search for any OOB-enabled UE 115 in its vicinity for an extended period of time (e.g. 48 hours). The UE 115 may be engaged in an active macro communications, like a voice call or a data call, that may be facilitated by the source SGSN/MSC 250 via the source macrocell 105 and/or RNC 120. At some time, the UE 115 may move into proximity of the femtocell 125. At block 1008, the femtocell 125, through an OOB frequency module 240 for example, may detect the UE 115 in its proximity. The femtocell 125 may transmit a proximity indication message at block 1012 to the femtocell gateway 140. As discussed above, the proximity indication message may include an identifier of the UE 115, an identifier of the femtocell 125, and/or a frequency of the femtocell 125. Block 1013 shows the proximity indication message being forwarded from the femtocell gateway 140 to the SGSN/MSC 250. Block 1014 shows the proximity indication then being forwarded from the SGSN/MSC 250 to the RNC 120. Upon receiving the proximity indication message, the RNC 120 may direct the UE 115, through macrocell 105, in different ways as shown at block 1015. For example, the RNC 120 may send a request to the UE 115, which may include triggering a search. Block 1020 shows an example where the RNC 120 sends a measurement control message to the UE 115. Block 1030 shows UE 115 detecting the femtocell 125. In some situations, the UE 115 may proceed to perform a handover to the femtocell 125 as shown with block 1040 and 1045.

It is worth noting that the call flow diagram 1000 is intended to show one example of a exemplary call flow and is simplified in many ways to add clarity. For example, while a "proximity indication" is discussed in a number of blocks, it will be appreciated that each element may communicate the message in similar or different forms with similar or different information included. As such, the call flow diagram 1000 should not be construed as limiting the scope of the disclosure or claims.

Figure 11A:
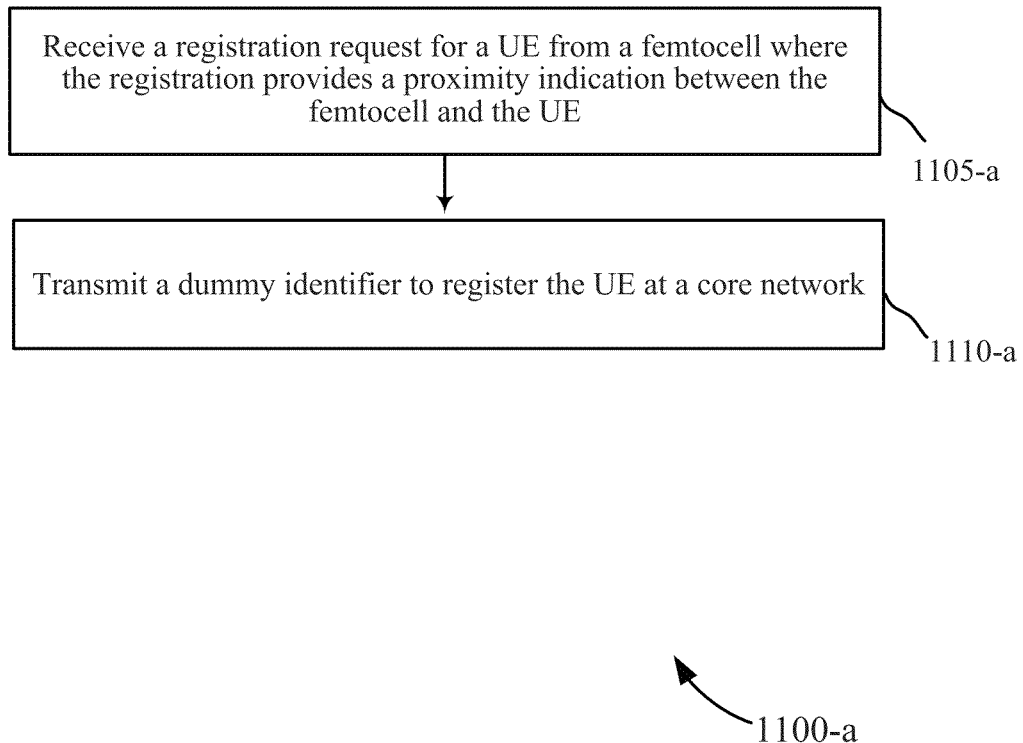
FIG. 11A shows a flow diagram of a method for providing mobile identity to assist in resolving femtocell disambiguation in accordance with various embodiments.

Turning to FIG. 11A, a flowchart illustrating a method 1100-*a* for providing mobile identity to assist in resolving femtocell disambiguation in accordance with various embodiments. The method 1100-*a* may be performed by a core network 130 device and/or system, such as the gateway 140 of FIG. 1, the femtocell gateway 140-*a* of FIG. 2, and/or the femtocell gateway 140-*b*. of FIG. 5, for example.

At block 1105-*a*, a registration request for a UE 115 may be received from a femtocell 125. The registration may provide a proximity indication between the femtocell 125 and the UE 115. At block 1110-*a*, a dummy identifier may be transmitted to register the UE 115 at a core network 130.

The dummy identifier may include a unique identifier of the UE 115 associated with a macro identifier of the UE 115. For example, the dummy identifier may include an OOB identifier of the UE 115.

Figure 11B:
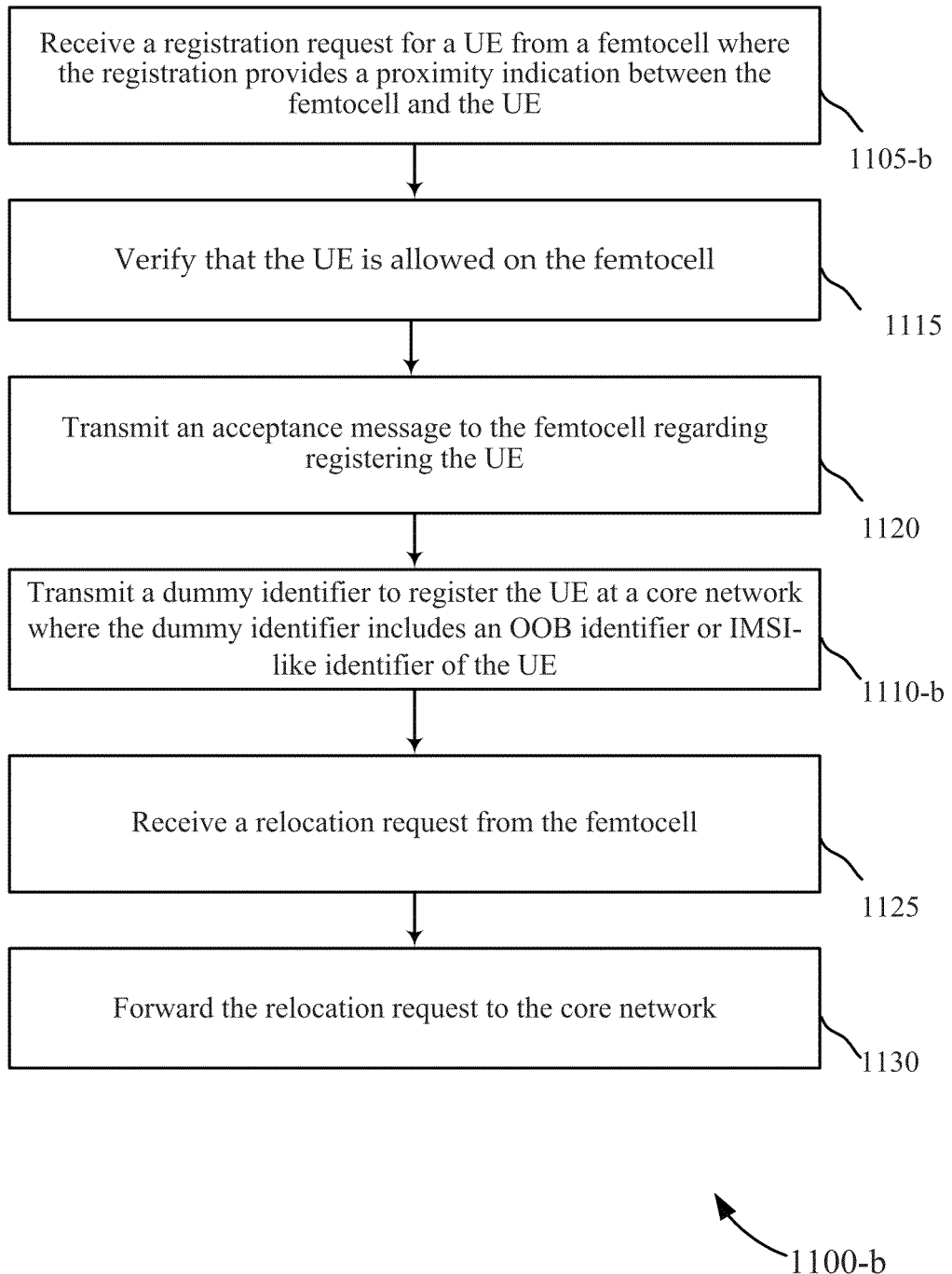
FIG. 11B shows a flow diagram of a method for providing mobile identity to assist in resolving femtocell disambiguation in accordance with various embodiments.

Turning to FIG. 11B, a flowchart illustrating a method 1100-*b* for providing mobile identity to assist in resolving femtocell disambiguation in accordance with various embodiments. The method 1100-*a* may, for example, be performed by a core network 130 device and/or system, such as the gateway 140 of FIG. 1, the femtocell gateway 140-*a* of FIG. 2, and/or the femtocell gateway 140-*b* of FIG. 5, for example. The method 1100-*b* may be an example of the method 1100-*a* of FIG. 11A.

At block 1105-*b*, a registration request for a UE 115 may be received from a femtocell 125. The registration may provide a proximity indication between the femtocell 125 and the UE 115. At block 1115, it may be verified that the UE 115 is allowed on the femtocell 125. At block 1120, an acceptance message may be transmitted to the femtocell 125 regarding registering the UE 115. At block 1110-*b*, a dummy identifier may be transmitted to register the UE 115 at a core network 130. The dummy identifier may include an OOB identifier or an IMSI-like identifier of the UE 115. At block 1125, a relocation request may be received from the femtocell 125. At block 1130, the relocation request may be forwarded to the core network 130.

In some cases, the relocation request may include an identifier of the femtocell 125 and an identifier of a macro network 100. The registration request may include an OOB identifier of the UE 115 and a macro identifier of the UE 115.

Figure 12:
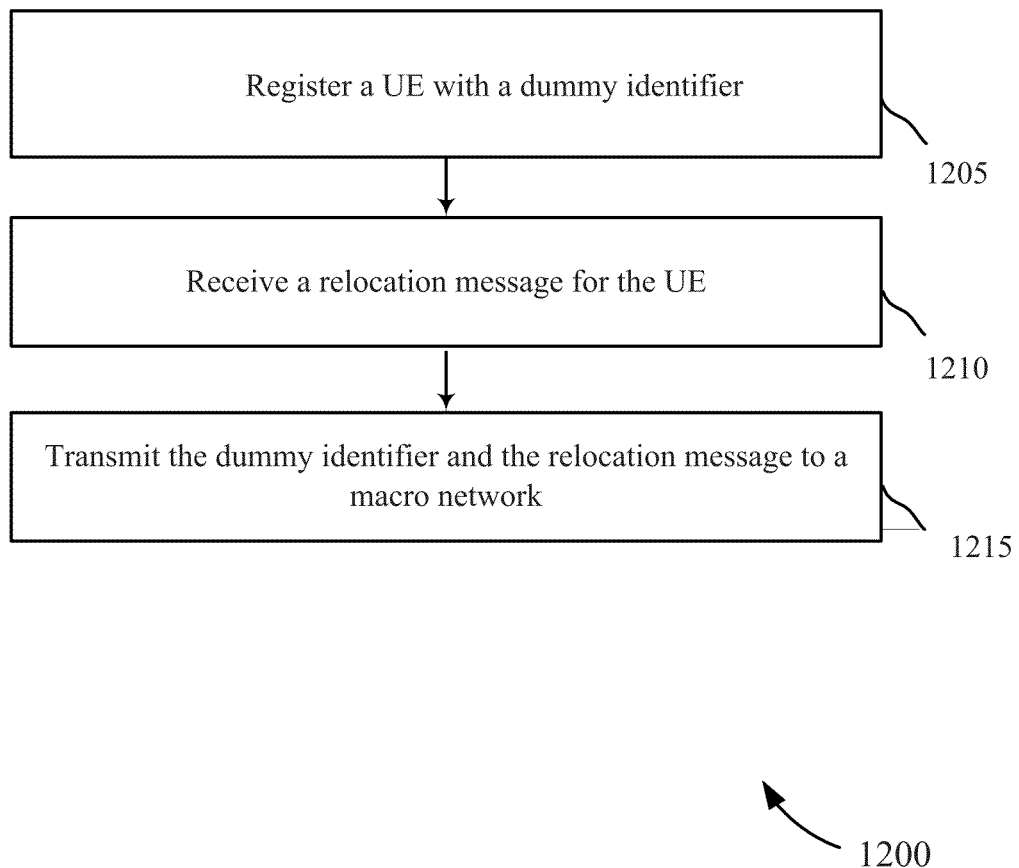
FIG. 12 shows a flow diagram of a method for providing mobile identity to assist in resolving femtocell disambiguation in accordance with various embodiments.

Turning to FIG. 12, a flowchart illustrating a method 1200 for providing mobile identity to assist in resolving femtocell disambiguation in accordance with various embodiments. The method 1200 may be performed by a core network 130 device and/or system, such as the core network 130 of FIG. 1, the SGSN/MSC 250 of FIG. 2, the SGSN/MSC 250 of FIG. 5 and/or SGSN/MSC 250-*a* of FIG. 6, for example.

At block 1205, a UE 115 may be registered at a core network 130 with a dummy identifier. At block 1210, a relocation message for the UE 115 may be received at the core network 130. At block 1215, the dummy identifier and the relocation message may be transmitted from the core network 130 to a macro network 100. The dummy identifier may be determined for transmission to the macro network utilizing the UE 115 registration at the core network 130.

Figure 13:
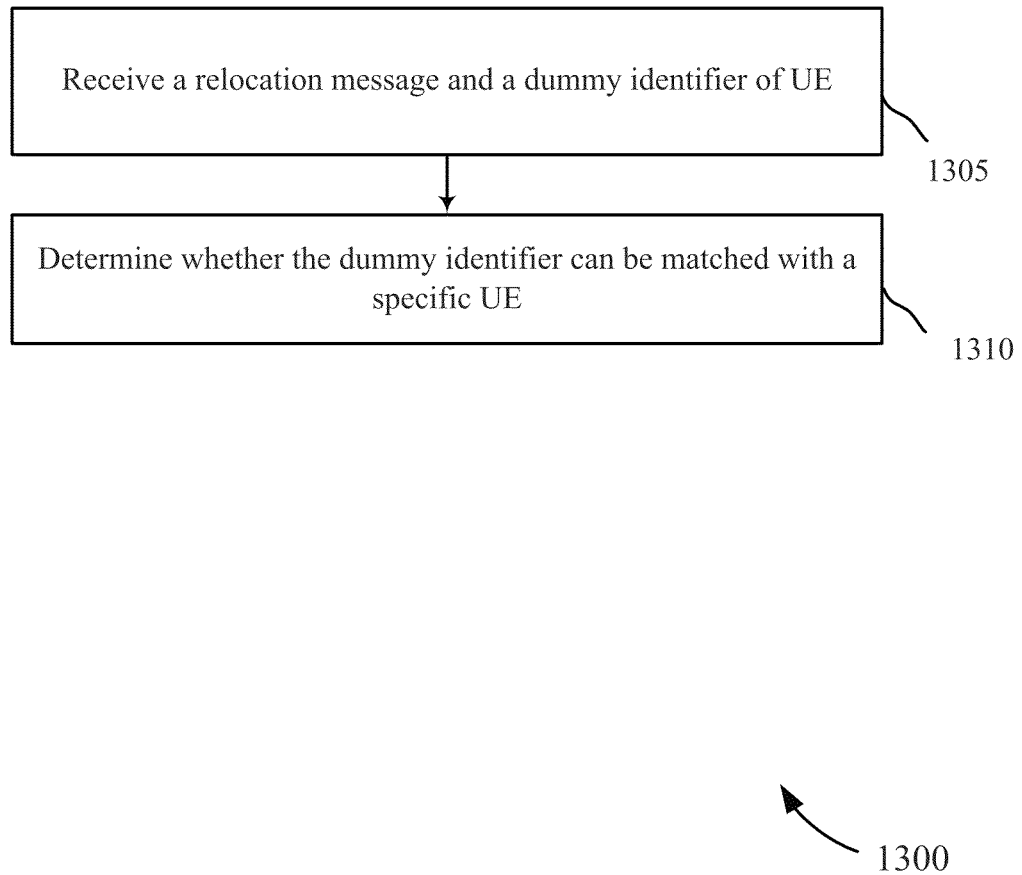
FIG. 13 shows a flow diagram of a method for providing mobile identity to assist in resolving femtocell disambiguation in accordance with various embodiments.

Turning to FIG. 13, a flowchart illustrating a method 1300 for providing mobile identity to assist in resolving femtocell disambiguation in accordance with various embodiments. The method 1300 may be performed by a macro network 100 device and/or system, such as the controller 120 of FIG. 1, the RNC 120-*a* of FIG. 2, the RNC 120 of FIG. 5, and/or RNC 120-*b* of FIG. 7, for example.

At block 1305, a relocation message and a dummy identifier of a UE 115 may be received at a macro network 100. At block 1310, the macro network 100 may determine whether the dummy identifier can be matched with a specific UE 115. Some embodiments may also include one or more UEs 115 being directed to perform at least an inter-frequency or an intra-frequency scan for one or more femtocells 125 in response to receiving the dummy identifier.

Determining whether the dummy identifier can be matched with the specific UE 115 may involve determining the specific UE 115 matched with the dummy identifier. Directing the one or more UEs 115 associated with the dummy identifier to perform the inter-frequency or the intra-frequency scan for one or more femtocells 125 may include directing the UE 115 to perform the inter-frequency or the intra-frequency scan for one or more femtocells 125.

In some situations, determining whether the dummy identifier can be matched with the specific UE 115 may include determining that no UE 115 matches with the dummy identifier. Directing the one or more UEs 115 to perform the inter-frequency or the intra-frequency scan for the one or more femtocells 115 may include determining a list of one or more candidate UEs 115 to direct to perform the inter-frequency or the intra-frequency scan for the one or more femtocells 125. Some embodiments may further include determining one or more frequencies for the inter-frequency scan or the intra-frequency scan.

Figure 14:
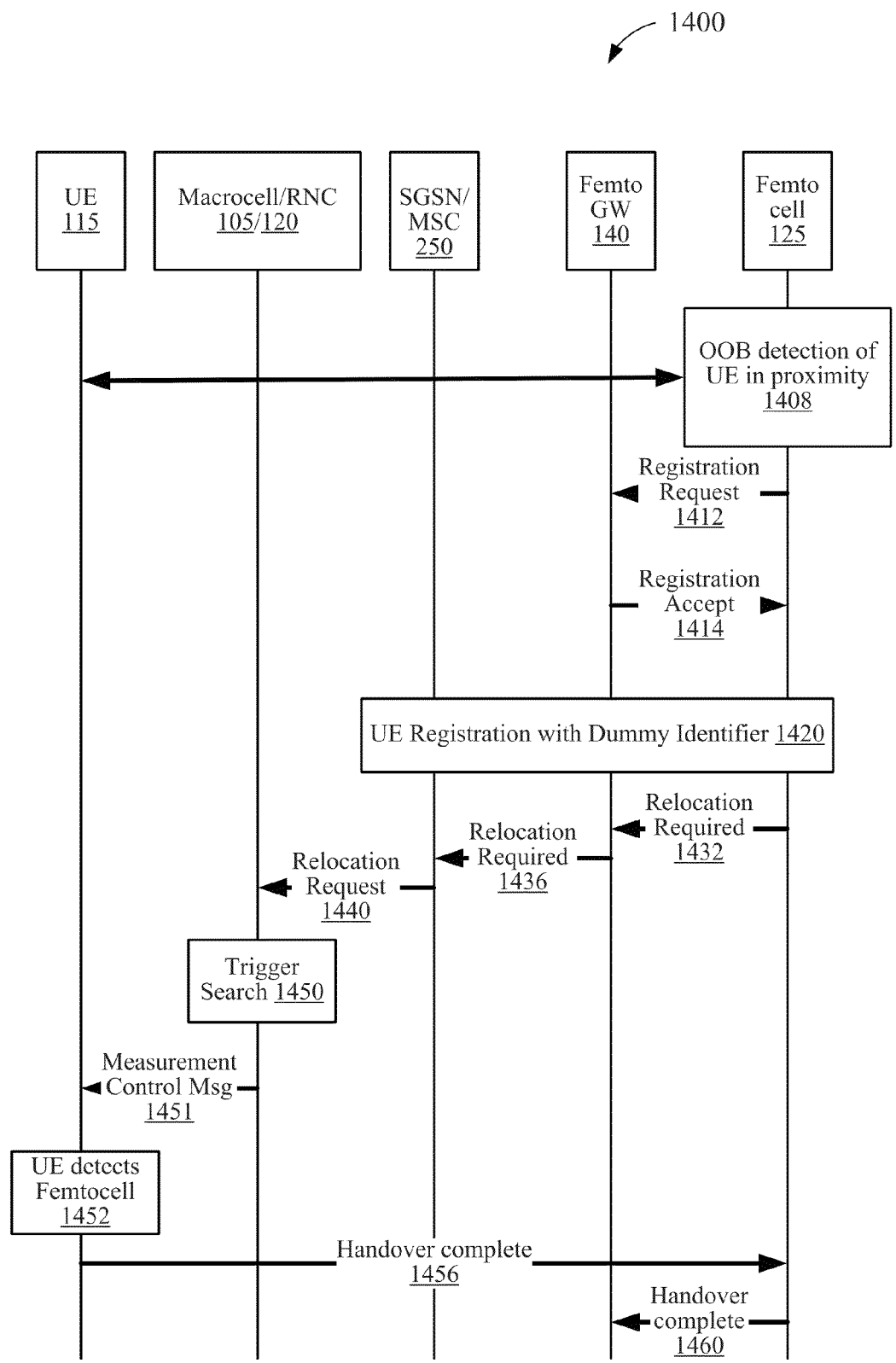
FIG. 14 shows a call flow diagram illustrating the use of a dummy identifier for providing mobile identity to assist in resolving femtocell disambiguation in accordance with various embodiments.

A call flow diagram 1400 is shown in FIG. 14 that illustrates the use of a dummy identifies to address femtocell disambiguation resolution problems and the triggering of inter-frequency searches at an RNC of a macrocell according to methods 1100-*a* of FIG. 11A, 1100-*b* of FIG. 11B, 1200 of FIG. 12, and/or 1300 of FIG. 13, for example. The call flow diagram 1400 shows communications between a UE 115, a currently connected (source) macrocell 105, an RNC 120, a source SGSN/MSC 250, a target femtocell gateway 140, and a target femtocell 125. For the sake of avoiding excess detail, the signaling between source macrocell 105 in communication with a macro RNC 120, is not shown.

The call flow diagram 1400 may begin at block 1408. The UE 115 may be engaged in an active macro communications, like a voice call or a data call, that may be facilitated by the source SGSN/MSC 250 via the source macrocell 105 and/or RNC 120. At some time, the UE 115 may move into proximity of the femtocell 125. At block 1408, the femtocell 125, through an OOB frequency module 240 for example, may detect the UE 115 in its proximity. The femtocell 125 may transmit a registration request to the femtocell gateway 140 at block 1412. The femtocell gateway 140 may send a registration acceptance message to the femtocell 125 at block 1414. Block 1420 then shows the process of registering the UE 115 at the core network, such as at SGSN/MSC 250, with a dummy identifier. The femtocell 125 may send a relocation required message at block 1432 to the femtocell gateway 140. The femtocell gateway 140 may then forward the relocation required message to the SGSN/MSC 250 at block 1436. At block 1440, the SGSN/MSC 250 may then send a relocation request to the RNC 120, where the relocation request includes the dummy identifier of the UE 115. Upon receiving the relocation request message, the RNC 120 may direct one or more UEs 115, based on the dummy identifier, in different ways as shown at block 1450. For example, the RNC 120 may send a request to the UE 115, which may include triggering a search. Block 1451 shows an example where the RNC 120 sends a measurement control message to the UE 115. At block 1452, the UE 115 may detect the femtocell 125. In some situations, the UE 115 may proceed to perform a handover to the femtocell 125 as shown with block 1456 and 1460.

It is worth noting that the call flow diagram 1400 is intended to show one example of a exemplary call flow and is simplified in many ways to add clarity. For example, while the relocation messages are discussed in a number of blocks, it will be appreciated that each element may communicate the message in similar or different forms with similar or different information included. As such, the call flow diagram 1400 should not be construed as limiting the scope of the disclosure or claims.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

The detailed description set forth above in connection with the appended drawings describes examples and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the description is not to be limited to the examples and designs described herein, but is to be accorded the widest scope consistent with the principles and novel features disclosed herein.

The invention claimed is:

1. A method of utilizing a proximity indication message from a femtocell regarding a user equipment, the method comprising:
   receiving, at a core network interface, the proximity indication message originating from the femtocell, wherein the proximity indication message indicates that the user equipment is in proximity to the femtocell; and
   transmitting, from a macro network interface, a request to the user equipment based on receiving the proximity indication message from the femtocell, wherein the request directs the user equipment to perform one or more actions.

2. The method of claim 1, wherein the proximity indication message includes an identifier of the user equipment, an identifier of the femtocell, and a frequency of the femtocell.

3. The method of claim 2, further comprising:
   determining a macro identifier of the user equipment utilizing the identifier of the user equipment, wherein the identifier of the user equipment includes an out-of-band (OOB) identifier of the user equipment.

4. The method of claim 1, wherein the request transmitted to the user equipment directs the user equipment to do a handover to the femtocell.

5. The method of claim 1, wherein the request transmitted to the user equipment directs the user equipment to perform one or more measurements of the femtocell.

6. The method of claim 5, further comprising:
directing the user equipment to do a handover to the femtocell based on the one or more measurements.

7. The method of claim 1, wherein the request transmitted to the user equipment directs the user equipment to read system information of the femtocell.

8. The method of claim 1, wherein the request transmitted to the user equipment directs the user equipment to perform an inter-frequency scan for one or more femtocells.

9. The method of claim 1, wherein the request transmitted to the user equipment directs the user equipment to perform an intra-frequency scan for one or more femtocells.

10. The method of claim 1, wherein the request transmitted to the user equipment occurs when a signal strength between the user equipment and a macrocell is above a threshold.

11. A system for utilizing a proximity indication message from a femtocell regarding a user equipment, the system comprising:
a means for receiving, at a core network interface, the proximity indication message originating from the femtocell, wherein the proximity indication message indicates that the user equipment is in proximity to the femtocell; and
a means for transmitting, from a macro network interface, a request to the user equipment based on receiving the proximity indication message from the femtocell, wherein the request directs the user equipment to perform one or more actions.

12. The system of claim 11, further comprising:
a means for determining a macro identifier of the user equipment utilizing an identifier of the user equipment, wherein the identifier of the user equipment includes an OOB identifier of the user equipment, wherein the request directs the user equipment to perform one or more actions.

13. A network device comprising:
a core network interface configured to receive a proximity indication message originating from a femtocell, wherein the proximity indication message indicates that a user equipment is in proximity to the femtocell; and
a macro network interface configured to transmit a request to the user equipment based on receiving the proximity indication message from the femtocell, wherein the request directs the user equipment to perform one or more actions.

14. The network device of claim 13, wherein the request transmitted to the user equipment directs the user equipment to do a handover to the femtocell.

15. The network device of claim 13, wherein the request transmitted to the user equipment directs the user equipment to perform one or more measurements of the femtocell.

16. The network device of claim 13, wherein the request transmitted to the user equipment directs the user equipment to perform at least an intra-frequency scan or an inter-frequency scan for one or more femtocells.

17. A computer program product for utilizing a proximity indication message from a femtocell regarding a user equipment, the computer program product comprising:
a non-transitory computer-readable medium comprising:
code for receiving, at a core network interface, the proximity indication message originating from the femtocell, wherein the proximity indication message indicates that the user equipment is in proximity to the femtocell; and
code for transmitting, from a macro network interface, a request to the user equipment based on receiving the proximity indication message from the femtocell, wherein the request directs the user equipment to perform one or more actions.

18. A method for a femtocell to indicate proximity of a user equipment, the method comprising:
detecting, at the femtocell, the user equipment in proximity to the femtocell using an out-of-band (OOB) communications link;
receiving information from the user equipment; and
transmitting, from the femtocell, a proximity indication message that includes at least a portion of the information from the user equipment to a macro network via a core network.

19. The method of claim 18, wherein the proximity indication message identifies the user equipment and the femtocell.

20. The method of claim 19, wherein the proximity indication message comprises an identifier of the user equipment, an identifier of the femtocell, and a frequency of the femtocell.

21. The method of claim 20, wherein the user equipment identifier comprises an international mobile subscriber identity (IMSI) of the user equipment.

22. The method of claim 20, wherein the user equipment identifier comprises an OOB identifier of the user equipment.

23. The method of claim 20, wherein the femtocell identifier comprises a primary scrambling code (PSC) of the femtocell.

24. A system for a femtocell to indicate proximity of a user equipment, the system comprising:
a means for detecting, at the femtocell, the user equipment in proximity to the femtocell using an out-of-band (OOB) communications link;
a means for receiving information from the user equipment; and
a means for transmitting, from the femtocell, a proximity indication message that includes at least a portion of the information from the user equipment to a macro network via a core network.

* * * * *